US012203601B1

(12) United States Patent
Tubb et al.

(10) Patent No.: US 12,203,601 B1
(45) Date of Patent: Jan. 21, 2025

(54) THIEF HATCHES FOR PRESSURE VESSEL SYSTEMS

(71) Applicant: EOG Resources, Inc., Houston, TX (US)

(72) Inventors: George Wyatt Tubb, Bulverde, TX (US); Christopher Hayden Palmer, San Antonio, TX (US); Davis Lunsford, Fort Worth, TX (US); Tyler Newman Denham, Fort Worth, TX (US); Jeremy Thomas, Weatherford, TX (US); Robert Lou Brown, IV, Cibolo, TX (US); Derek Spencer Duckworth, San Antonio, TX (US)

(73) Assignee: EOG Resources, Inc., Houston, TX (US)

(*) Notice: Subject to any disclaimer, the term of this patent is extended or adjusted under 35 U.S.C. 154(b) by 0 days.

(21) Appl. No.: 18/613,866

(22) Filed: Mar. 22, 2024

Related U.S. Application Data

(60) Provisional application No. 63/621,903, filed on Jan. 17, 2024, provisional application No. 63/454,165, filed on Mar. 23, 2023.

(51) Int. Cl.
*F17C 13/12* (2006.01)

(52) U.S. Cl.
CPC ...... *F17C 13/12* (2013.01); *F17C 2205/0332* (2013.01)

(58) Field of Classification Search
CPC .......................... F17C 13/12; F17C 2205/0332
USPC ........... 137/455, 14, 115.01, 115.13, 115.16, 137/119.08, 119.09, 315.33, 463, 464, 137/467, 534, 587, 589, 375, 376, 377, 137/384; 277/309, 311, 353, 402, 403, 277/434, 458, 530, 566
See application file for complete search history.

(56) References Cited

U.S. PATENT DOCUMENTS 2,317,923 A * 4/1943 Lebo ........................ F16K 17/19 137/526
3,183,008 A * 5/1965 Yost ...................... F16J 15/3236 277/460
4,721,129 A * 1/1988 Sousa ...................... F16K 17/04 137/538
5,165,445 A * 11/1992 Vertanen ............... F16K 17/196 137/493.9
(Continued)

FOREIGN PATENT DOCUMENTS

CA 2771919 A1 9/2013
CA 2854032 A1 12/2015

OTHER PUBLICATIONS

Emerson, Anderson Greenwood Type 4130 Atmospheric Pressure Relief Valves, Emerson.com, 2017, VCTDS-03741-EN 24/02.
(Continued)

*Primary Examiner* — Minh Q Le
(74) *Attorney, Agent, or Firm* — Conley Rose, P.C.

(57) ABSTRACT

A thief hatch for a pressure vessel system including an annular seal flange attachable to an opening of a pressure vessel of the pressure vessel system, a piston coupled to the seal flange, an annular seal assembly located between an outer surface of the piston and an inner surface of the seal flange, and a biasing element coupled to the piston and configured to apply a biasing force against the piston to bias the piston towards a first position corresponding to a closed configuration of the thief hatch.

27 Claims, 14 Drawing Sheets

(56) References Cited

U.S. PATENT DOCUMENTS

| | | | | | |
|---|---|---|---|---|---|
| 5,368,067 | A * | 11/1994 | Cook, Jr. | F17B 1/26 | 137/485 |
| 6,315,299 | B1 * | 11/2001 | Taylor | F16J 15/328 | 277/924 |
| 6,340,031 | B1 * | 1/2002 | Matsumoto | F16K 15/063 | 137/542 |
| 6,722,658 | B2 * | 4/2004 | Siegrist | F16J 15/3236 | 277/552 |
| 6,736,164 | B2 * | 5/2004 | Pozgainer | F16K 17/04 | 137/565.25 |
| 7,007,954 | B2 * | 3/2006 | Travers | F16J 15/025 | 277/626 |
| 8,056,903 | B2 * | 11/2011 | Matsui | C08G 18/10 | 277/567 |
| 8,534,308 | B2 | 9/2013 | Nunez | | |
| 8,561,637 | B2 | 10/2013 | Petrarca et al. | | |
| 9,296,530 | B2 | 3/2016 | Cockerham et al. | | |
| 9,447,891 | B2 * | 9/2016 | Murray | F16K 39/024 | |
| 9,777,856 | B2 | 10/2017 | Myers et al. | | |
| 9,810,332 | B2 * | 11/2017 | Chapman | F21V 31/03 | |
| 10,208,866 | B2 | 2/2019 | Fisher | | |
| 10,443,301 | B2 | 10/2019 | Bartha et al. | | |
| 11,352,203 | B2 | 6/2022 | Anderson | | |
| 2013/0264341 | A1 * | 10/2013 | Cockerham | B65D 90/34 | 220/203.29 |
| 2016/0236835 | A1 | 8/2016 | Xiqing et al. | | |
| 2020/0340880 | A1 | 10/2020 | Hanceanu et al. | | |

OTHER PUBLICATIONS

Emerson, Enardo 2000 and Enardo 2500 Series Emergency Pressure Relief Vents (ATEX Approved), Instruction Manual D103818X012, Mar. 2024.

Emerson data sheet, Enardo 2100 Series Emergency Relief Vent https://www.emerson.com/documents/automation/data-sheets-enardo-2100-emergency-relief-vent-datasheet-enardo-en-en-6262106.pdf.

Emerson Enardo Models A, A-L, 110-PO and 200 Dead Weight Hatches, Instruction Manual D103839X012, Sep. 2018.

Hawkeye Industries Inc., Tankage, Emergency Venting, Series 5000 EPRV, Brochure May 2019. https://hawk-eye.com/wp-content/uploads/2020/04/Series-5000-EPRV-Brochure-1.pdf.

LaMOT Valve & Arrestor, Emergency Relief Vent Model L22E Datasheet. https://lamotvalvearrestor.com/products/emergency-relief-vent/.

* cited by examiner

THIEF HATCHES FOR PRESSURE VESSEL SYSTEMS

CROSS-REFERENCE TO RELATED APPLICATIONS

This application claims benefit of U.S. provisional patent application Ser. No. 63/454,165 filed Mar. 23, 2023, and entitled “Thief Hatches for Pressure Vessel Systems,” and U.S. provisional patent application Ser. No. 63/621,903 filed Jan. 17, 2024, and entitled “Thief Hatches for Pressure Vessel Systems,” each of which is hereby incorporated herein by reference in its entirety for all purposes.

STATEMENT REGARDING FEDERALLY SPONSORED RESEARCH OR DEVELOPMENT

Not applicable.

BACKGROUND

Pressure vessel systems typically include a pressure vessel defining an internal cavity in which materials such as fluids may be stored for a desired period of time. Pressure vessels typically have a designed maximum internal pressure that may not be exceeded without potentially jeopardizing the operability (e.g., the structural integrity) of the pressure vessel. To ensure the fluid pressure within internal cavity of the pressure vessel remains below this maximum operating pressure, pressure vessel systems often include a specialized pressure relief valve sometimes referred to as a “thief hatch.” Particularly, the thief hatch of a pressure vessel system includes a normally closed position restricting fluid flow from the internal cavity of the pressure vessel to the surrounding environment external the pressure vessel, and an activated or open position permitting fluid flow from the internal cavity of the pressure vessel to the external environment. The thief hatch of the pressure vessel system may be configured to actuate from the closed configuration to the open configuration in response to fluid pressure within the internal cavity of the pressure vessel achieving the maximum operational pressure of the pressure vessel, thereby preventing the fluid pressure within the internal cavity of the pressure vessel from exceeding the maximum operational pressure of the pressure vessel.

BRIEF SUMMARY OF THE DISCLOSURE

An embodiment of a thief hatch for a pressure vessel system comprises an annular seal flange extending between a first end and a second end opposite the first end, the seal flange comprising a central passage defined by an inner surface extending between the first end and the second end, wherein the first end is attachable to an opening of a pressure vessel of the pressure vessel system, a piston coupled to the seal flange and receivable in the central passage, the piston comprising an outer surface defining an annular interface between the outer surface of the piston and the inner surface of the seal flange, an annular seal assembly located along an annular interface between the outer surface of the piston and the inner surface of the seal flange, the seal assembly comprising an annular seal groove formed in one of the outer surface of the piston and the inner surface of the seal flange, and an annular seal at least partially received in the seal groove, and a biasing element coupled to the piston and configured to apply a biasing force against the piston to bias the piston towards a first position corresponding to a closed configuration of the thief hatch, wherein the thief hatch comprises the closed configuration in which the piston occupies the first position with the seal of the seal assembly sealingly contacting both the outer surface of the piston and the inner surface of the seal flange to seal the interface between the outer surface of the piston and the inner surface of the seal flange, and an open configuration in which the piston occupies a second position in which the seal of the seal assembly is spaced from at least one of the outer surface of the piston and the inner surface of the seal flange to permit fluid communication through the interface. In some embodiments, the inner surface of the seal flange comprises a tapered section having a non-zero taper angle, and wherein the sealing element contacts the tapered section of the inner surface when the thief hatch is in the closed configuration. In some embodiments, the taper angle of the tapered section is between 0° and 8°. In some embodiments, the taper angle of the tapered section is between 0° and 2°. In certain embodiments, the taper angle of the tapered section is between 3° and 6°. In certain embodiments, the inner surface comprises a frustoconical section located between the second end of the seal flange and the tapered section, and wherein the frustoconical section defines an annular relief extending radially between the frustoconical section and the outer surface of the piston. In some embodiments, a flow area defined by the inner surface of the seal flange is greater at the second end of the seal flange than at the first end of the seal flange. In some embodiments, the thief hatch comprises an annular wiper assembly located along the outer surface of the piston, the wiper assembly comprising an annular wiper groove formed in the outer surface of the piston and an annular wiper at least partially received in the wiper groove and in sliding contact with the inner surface of the seal flange to wipe the inner surface in response to actuation of the thief hatch between the closed configuration and the open configuration. In some embodiments, the thief hatch comprises a centering rod extending having a central axis that extends coaxially with a central axis of the piston, wherein the centering rod couples the piston to the seal flange so as to minimize angular deviations between the central axis of the piston and a central axis of the seal flange. In certain embodiments, the thief hatch comprises one or more support rods and a crossbar, wherein the one or more support rods couple between the crossbar and the seal flange and the crossbar defines a central aperture through which the centering rod extends, and wherein a friction reduction sleeve is positioned radially between the crossbar and the centering rod to reduce frictional drag between the crossbar and the centering rod. In certain embodiments, the crossbar comprises one or more apertures for receiving the one or more support rods, wherein a radial tolerance of at least 0.025 inches or greater is provided between the one or more apertures and the one or more corresponding support rods received therein. Additionally, an embodiment of a pressure vessel system comprises a pressure vessel defining an internal cavity and having an opening in fluid communication with the internal cavity, and the thief hatch, wherein the first end of the seal flange of the thief hatch is attached to the opening of the pressure vessel whereby a fluid flowpath is established when the thief hatch is in the open configuration extending from the internal cavity of the pressure vessel, through the opening of the pressure vessel and through the central passage of the seal flange, and into the external environment surrounding the thief hatch. In some embodiments, the thief hatch further comprises a weather cap coupled to the piston and comprising an external surface, and an internal surface opposite the external surface and defining an internal chamber in which the piston is at least partially received, and the seal flange seals against the piston, the tank flange, and the weather cap when the thief hatch is in the closed configuration.

An embodiment of a thief hatch for a pressure vessel system comprises an annular seal flange extending between a first end and a second end opposite the first end, the seal flange comprising a central passage, wherein the first end is attachable to an opening of a pressure vessel of the pressure vessel system, a piston coupled to the seal flange and receivable in the central passage, the piston comprising an outer surface defining an annular interface between the outer surface of the piston and a surface of the seal flange, an annular seal assembly located along an annular interface between the outer surface of the piston and the inner surface of the seal flange, the seal assembly comprising an annular seal groove formed in one of the outer surface of the piston and the inner surface of the seal flange, and an annular seal at least partially received in the seal groove, and a biasing element coupled to the piston and configured to apply a biasing force against the piston to bias the piston towards a first position corresponding to a closed configuration of the thief hatch, wherein the thief hatch comprises the closed configuration in which the piston occupies the first position with the X-ring seal of the seal assembly sealingly contacting both the outer surface of the piston and the surface of the seal flange to seal the interface between the outer surface of the piston and the surface of the seal flange, and an open configuration in which the piston occupies a second position in which the X-ring seal of the seal assembly is spaced from at least one of the outer surface of the piston and the surface of the seal flange to permit fluid communication through the annular interface. In some embodiments, the X-ring seal has a radial unsqueezed width and a radial squeezed width that is less than the radial unsqueezed width, and wherein a ratio of the radial squeezed width to the radial unsqueezed width is between 0.900:1 and 0.995:1. In some embodiments, the seal groove extends radially between a radially inner base and a radially outer opening, and wherein the width of the base of the seal groove is greater than the width of the opening of the seal groove whereby the opening of the groove axially compresses the X-ring seal. In certain embodiments, a ratio of the width of the base of the seal groove to the width of the opening of the seal groove is between 1.2:1 to 1.5:1. In certain embodiments, the surface of the seal flange comprises an inner surface that defines the central passage of the seal flange against which the sealing element of the seal assembly is in sealing contact when the thief hatch is in the closed configuration. In some embodiments, the piston is configured to actuate the thief hatch from the closed configuration to the open configuration in response to the application of a fluid pressure directed against the biasing force of the biasing element, wherein the fluid pressure is less than five pounds per square inch (PSI). Additionally, a pressure vessel system comprises a pressure vessel defining an internal cavity and having an opening in fluid communication with the internal cavity, and the thief hatch, wherein the first end of the seal flange of the thief hatch is attached to the opening of the pressure vessel whereby a fluid flowpath is established when the thief hatch is in the open configuration extending from the internal cavity of the pressure vessel, through the opening of the pressure vessel and through the central passage of the seal flange, and into the external environment surrounding the thief hatch.

An embodiment of a thief hatch for a pressure vessel system comprises an annular seal flange extending between a first end and a second end opposite the first end, the seal flange comprising a central passage, wherein the first end is attachable to an opening of a pressure vessel of the pressure vessel system, a piston coupled to the seal flange and receivable in the central passage, the piston comprising an outer surface defining an annular interface between the outer surface of the piston and a surface of the seal flange, an annular seal assembly located along an annular interface between the outer surface of the piston and the surface of the seal flange, the seal assembly comprising an annular seal groove formed in one of the outer surface of the piston and the surface of the seal flange, and an annular seal at least partially received in the seal groove, a biasing element coupled to the piston and configured to apply a biasing force against the piston to bias the piston towards a first position corresponding to a closed configuration of the thief hatch, a weather cap coupled to the piston and comprising an external surface, and an internal surface opposite the external surface and defining an internal chamber in which the piston is at least partially received, and an annular breathable gasket contacting both the internal surface of the weather cap and the second end of the seal flange to prevent debris from entering the internal chamber of the weather cap when the thief hatch is in the closed configuration, wherein the thief hatch comprises the closed configuration in which the piston occupies the first position with the seal of the seal assembly sealingly contacting both the outer surface of the piston and the surface of the seal flange to seal the interface between the outer surface of the piston and the surface of the seal flange, and an open configuration in which the piston occupies a second position in which the seal of the seal assembly is spaced from at least one of the outer surface of the piston and the surface of the seal flange to permit fluid communication through the annular interface. In some embodiments, the breathable gasket prevents at least some solid particles from entering the internal chamber from the external environment when the thief hatch is in the closed configuration but permits the communication of gasses between the internal chamber and the external environment when the thief hatch is in the closed configuration. In some embodiments, the surface of the seal flange comprises an inner surface that defines the central passage of the seal flange against which the sealing element of the seal assembly is in sealing contact when the thief hatch is in the closed configuration. In certain embodiments, an axially-projected surface area of the internal surface of the weather cap is greater than an axially-projected surface area of the outer surface of the piston.

BRIEF DESCRIPTION OF THE DRAWINGS

For a detailed description of exemplary embodiments of the disclosure, reference will now be made to the accompanying drawings in which.

DETAILED DESCRIPTION OF THE DISCLOSED EMBODIMENTS

Figure 1:
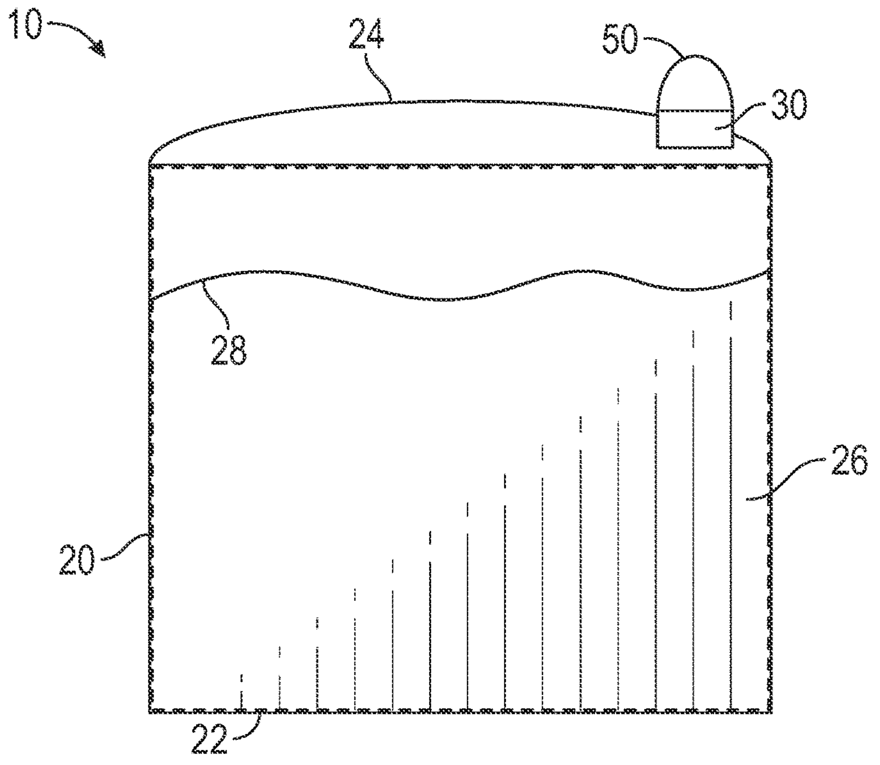
FIGS. 1 and 2 are schematic views of an embodiment of a pressure vessel system in accordance with principles described herein.

The following discussion is directed to various exemplary embodiments. However, one skilled in the art will understand that the examples disclosed herein have broad application, and that the discussion of any embodiment is meant only to be exemplary of that embodiment, and not intended to suggest that the scope of the disclosure, including the claims, is limited to that embodiment.

Certain terms are used throughout the following description and claims to refer to particular features or components. As one skilled in the art will appreciate, different persons may refer to the same feature or component by different names. This document does not intend to distinguish between components or features that differ in name but not function. The drawing figures are not necessarily to scale. Certain features and components herein may be shown exaggerated in scale or in somewhat schematic form and some details of conventional elements may not be shown in interest of clarity and conciseness.

In the following discussion and in the claims, the terms "including" and "comprising" are used in an open-ended fashion, and thus should be interpreted to mean "including, but not limited to . . . " Also, the term "couple" or "couples" is intended to mean either an indirect or direct connection. Thus, if a first device couples to a second device, that connection may be through a direct connection, or through an indirect connection via other devices, components, and connections. In addition, as used herein, the terms "axial" and "axially" generally mean along or parallel to a central axis (e.g., central axis of a body or a port), while the terms "radial" and "radially" generally mean perpendicular to the central axis. For instance, an axial distance refers to a distance measured along or parallel to the central axis, and a radial distance means a distance measured perpendicular to the central axis. As used herein, the terms "approximately," "about," "substantially," and the like mean within 10% (i.e., plus or minus 10%) of the recited value. Thus, for example, a recited angle of "about 80 degrees" refers to an angle ranging from 72 degrees to 88 degrees.

As described above, pressure vessel systems often include a pressure vessel and a thief hatch coupled therewith for managing the internal fluid pressure of the pressure vessel to ensure the internal fluid pressure does not exceed a maximum operating pressure of the pressure vessel. Typically, thief hatches generally include a seal flange coupled to an interface (e.g., a tank flange) of the pressure vessel, a venting hatch that controls fluid flow through the thief hatch, and a debris cover that protects the thief hatch from external or foreign debris.

The venting hatch of conventional thief hatches typically includes a piston biased into a closed position corresponding to the closed configuration of the thief hatch by a closing biasing force approximately equal to an opposing opening pressure force from fluid within the pressure vessel when the internal fluid pressure approaches the maximum operating pressure of the pressure vessel. Typically, the venting hatch of conventional thief hatches includes an annular face seal that seals against a corresponding seat of the thief hatch when the piston of the venting hatch is in the closed position.

The face seals of conventional thief hatches are prone to leak during their service life for a variety of reasons, resulting in the potential inadvertent discharge of fugitive emissions to the external environment. Particularly, pressure within the pressure vessel naturally resists and acts against the longitudinally opposed sealing force of the face seal, resulting in premature leakage of fluid within the pressure vessel as pressure within the pressure vessel increases towards the maximum operating pressure of the pressure vessel. As another example, debris may collect on the seat of the venting hatch of the conventional thief hatch, preventing the face seal from successfully sealing against the debris-covered seat. It may be noted that the debris covers of conventional thief hatches often only partially protect the thief hatch from foreign debris and may allow at least some foreign debris into the interior of the thief hatch over the service life thereof such that debris may eventually collect on the seat of the venting hatch of the conventional thief hatch. Additionally, the face seal may comprise a simple gasket that may corrode (e.g., becoming brittle and potentially cracking due to polymer crosslinking) or otherwise deteriorate over time, eventually resulting in the formation of a leak path between the seat and the face seal.

Accordingly, embodiments of pressure vessel systems are disclosed herein which include a thief hatch that relies on sliding contact between a seal of an annular seal assembly positioned on a piston of the thief hatch and an inner surface of a seal flange of the thief hatch defining a central passage of the seal flange for sealing the thief hatch when in a closed configuration. The sliding contact between the seal, as well as between an optional wiper, and the inner surface of the seal flange wipes or removes foreign debris from the inner surface which may otherwise form leak paths between the annular interface formed between the piston and the seal flange. Additionally, the inner surface of the seal flange which the annular seal assembly seals against is oriented substantially perpendicular to the direction of fluid flow through the seal flange whereby an increase in fluid pressure within the seal flange does not result, as with conventional face seals, in a concomitant decrease in the sealing force or pressure between the annular seal assembly and the inner surface of the seal flange. In this manner, unlike conventional face seals, the seal assembly described herein will not leak prematurely and instead will maintain a seal between the seal assembly and the seal flange until a predefined threshold pressure has been achieved.

In some embodiments, the inner surface of the seal flange is tapered to maintain sealing contact between the tapered inner surface and the seal in both hot and cold temperatures which may influence the radial width of the seal (e.g., the seal growing larger in hotter temperatures and shrinking to smaller sizes in colder temperatures). Additionally, the tapered inner surface of the seal flange also provides an added mechanical advantage in compressing the seal of the annular seal assembly in sealing contact with the inner surface to thereby reliably compress the seal.

Additionally, in some embodiments, the seal is configured to minimize frictional drag between the piston and the seal flange, such as an X-ring seal as will be further discussed herein. Still further, in certain embodiments, the thief hatch also includes a weather cap configured to seal against a breathable gasket interposed between the weather cap and the seal flange when the thief hatch is in the closed configuration. In this manner, foreign debris may be prevented from entering an internal chamber defined by the weather cap when the thief hatch is in the closed configuration while still permitting the communication of gasses between the internal chamber and the external environment so as to prevent or at least inhibit the formation of fluid pressure within the internal chamber.

Figure 2:
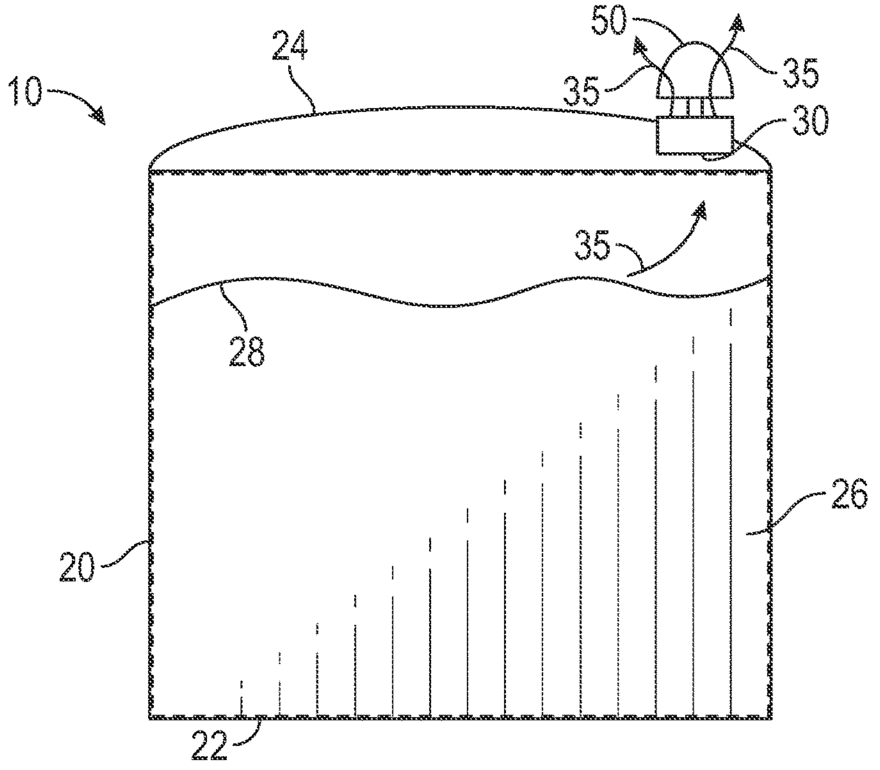

Referring now to FIGS. 1 and 2, an embodiment of a pressure vessel system 10 is shown. Particularly, in this exemplary embodiment, pressure vessel system 10 generally includes a pressure vessel 20 and a thief hatch 50 coupled to the pressure vessel 20. The pressure vessel 20 extends vertically between a bottom 22 situated on or proximal the ground and a top 24 vertically opposite the bottom 22. Additionally, pressure vessel 20 includes an internal cavity 26 that, in this exemplary embodiment, is at least partially filled with a fluid 28. Further, pressure vessel 20 includes an opening or tank flange 30 located at the top 24 of pressure vessel 20. Tank flange 30 provides access to the internal cavity 26 of the pressure vessel 20. Pressure vessel 20 may comprise a storage tank in some embodiments, but it may be understood that the configuration of pressure vessel 20 may vary substantially in other embodiments.

The thief hatch 50 of pressure vessel system 10 is coupled to the tank flange 30 of pressure vessel 20 at the top 24 of pressure vessel 20. Thief hatch 50 includes a normally closed position or configuration shown in FIG. 1, and a second or open position or configuration shown in FIG. 2. In the closed configuration, thief hatch 50 restricts and/or prevents fluid communication between the internal cavity 26 of pressure vessel 20 and the external environment surrounding the pressure vessel 20 such that the internal cavity 26 is sealed from the external environment. Conversely, in the open configuration, thief hatch 50 permits fluid communication between the internal cavity 26 of pressure vessel 20 and the external environment surrounding the pressure vessel 20 such that fluid may flow from the internal cavity 26 to the external environment.

Thief hatch 50 is configured to automatically transition or actuate from the closed configuration shown in FIG. 1 to the open configuration shown in FIG. 2 in response to fluid pressure within the internal cavity 26 of pressure vessel 20 reaching a predefined threshold pressure, such as a maximum operating pressure of the pressure vessel 20 that is based on the configuration and design of the pressure vessel 20. For example, fluid vapor may collect within the internal cavity 26 of pressure vessel 20 and increase in pressure until the fluid pressure within the internal cavity 26 reaches the threshold pressure. Upon reaching the threshold pressure, the thief hatch 50 actuates automatically from the closed configuration shown in FIG. 1 to the open configuration shown in FIG. 2 whereby a fluid flowpath (indicated by arrows 35 in FIG. 2) is formed between the internal cavity 26 of pressure vessel 20 and the external environment. Flowpath 35 permits excess fluid vapor within the internal cavity 26 of pressure vessel 20 to escape to the surrounding atmosphere, thereby relieving pressure within the internal cavity 26 such that the fluid pressure within internal cavity 26 drops below the threshold pressure. Thief hatch 50 automatically actuates from the open configuration shown in FIG. 2 to the closed configuration shown in FIG. 1 upon the fluid pressure within internal cavity 26 of pressure vessel 20 falling below the threshold pressure. Alternatively, the threshold pressure for opening the thief hatch 50 may comprise a first threshold pressure, and the thief hatch 50 may only return to the closed configuration upon the fluid pressure within internal cavity 26 equaling or falling below a second threshold pressure which is less than the first threshold pressure.

Figure 3:
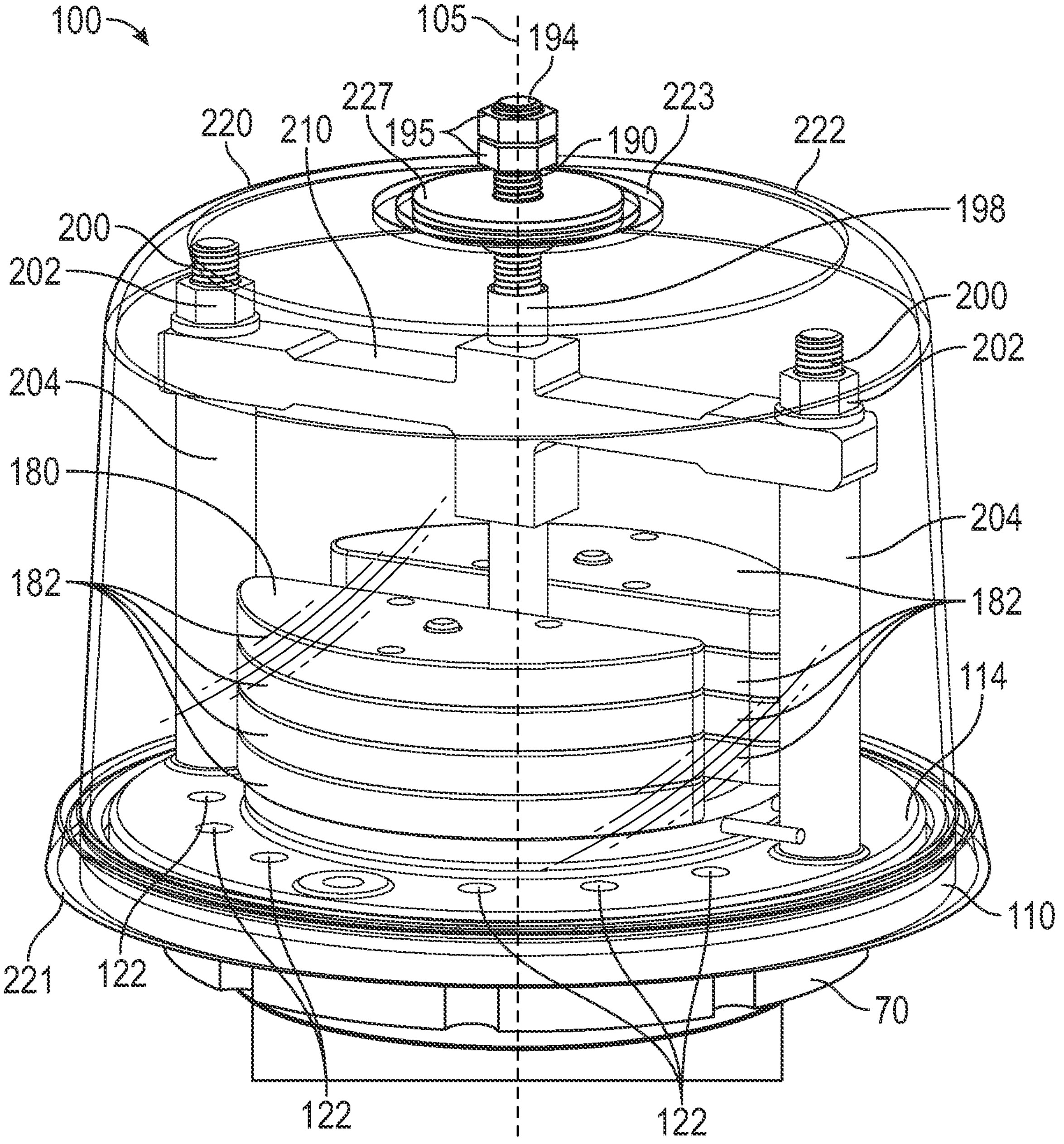
FIG. 3 is a perspective view of an embodiment of a thief hatch in accordance with principles described herein.
Figure 4:
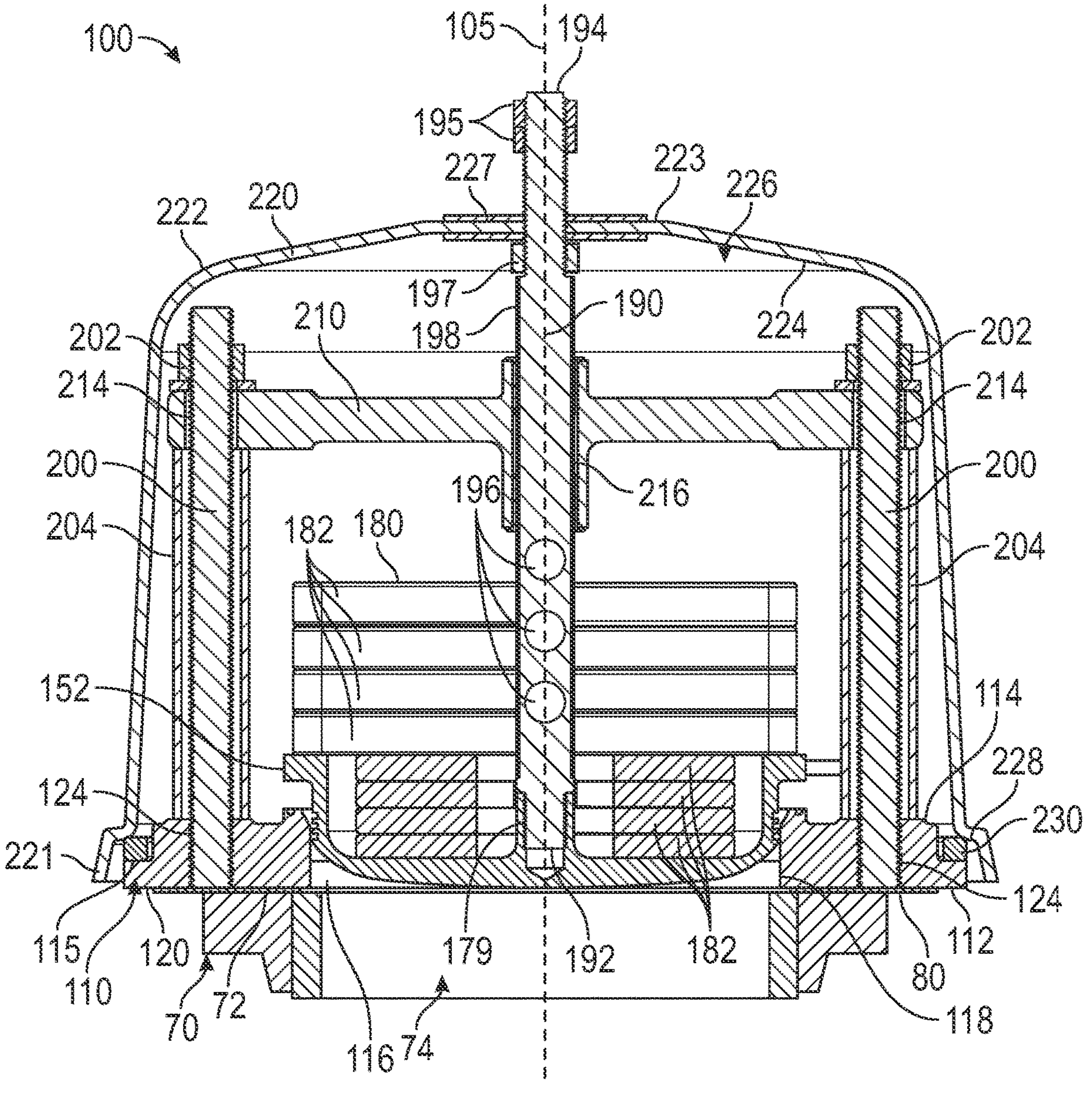
FIG. 4 is a side cross-sectional view of the thief hatch of FIG. 3 in a closed position.
Figure 5:
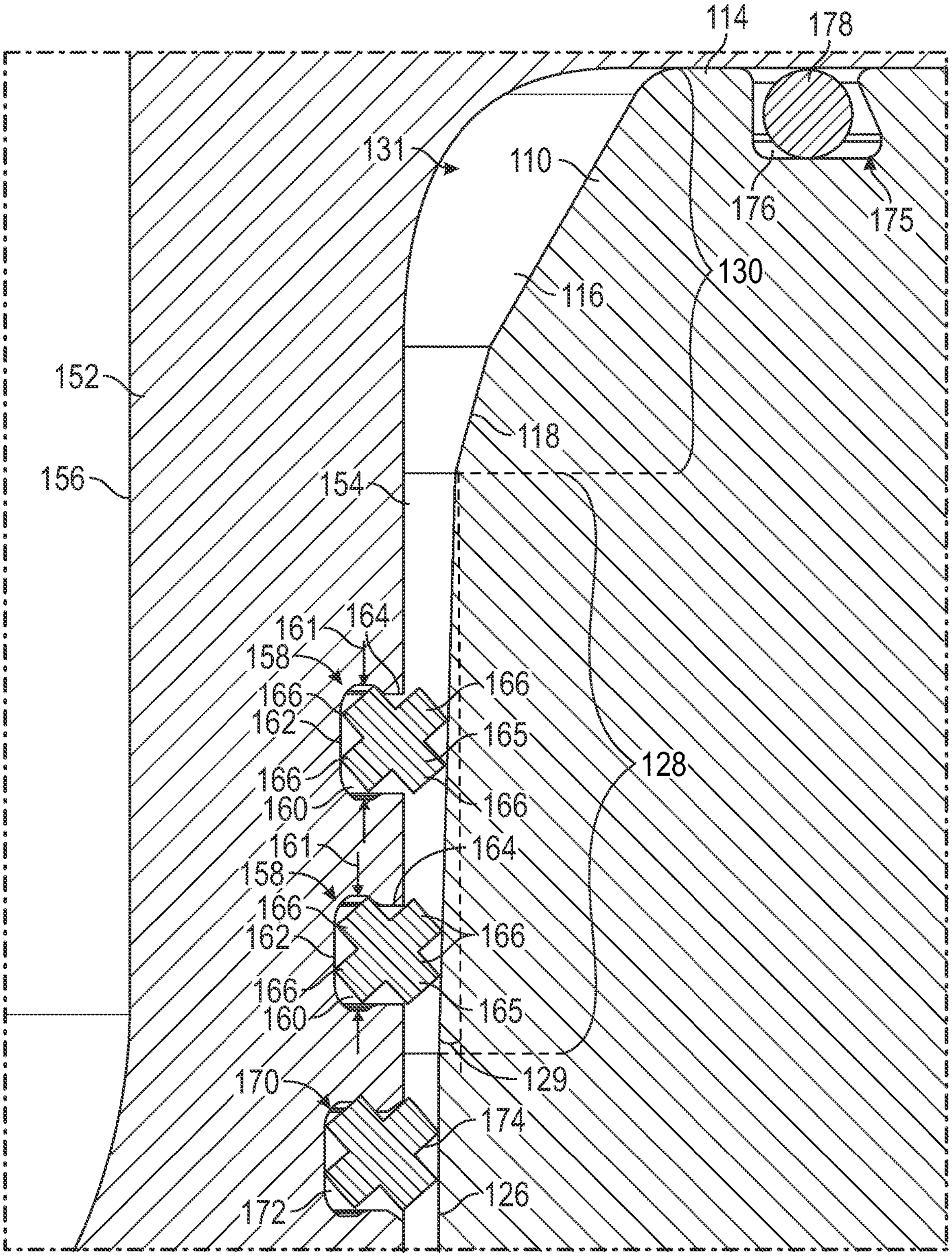
FIG. 5 is an enlarged, side cross-sectional view of the thief hatch of FIG. 3.
Figure 6:
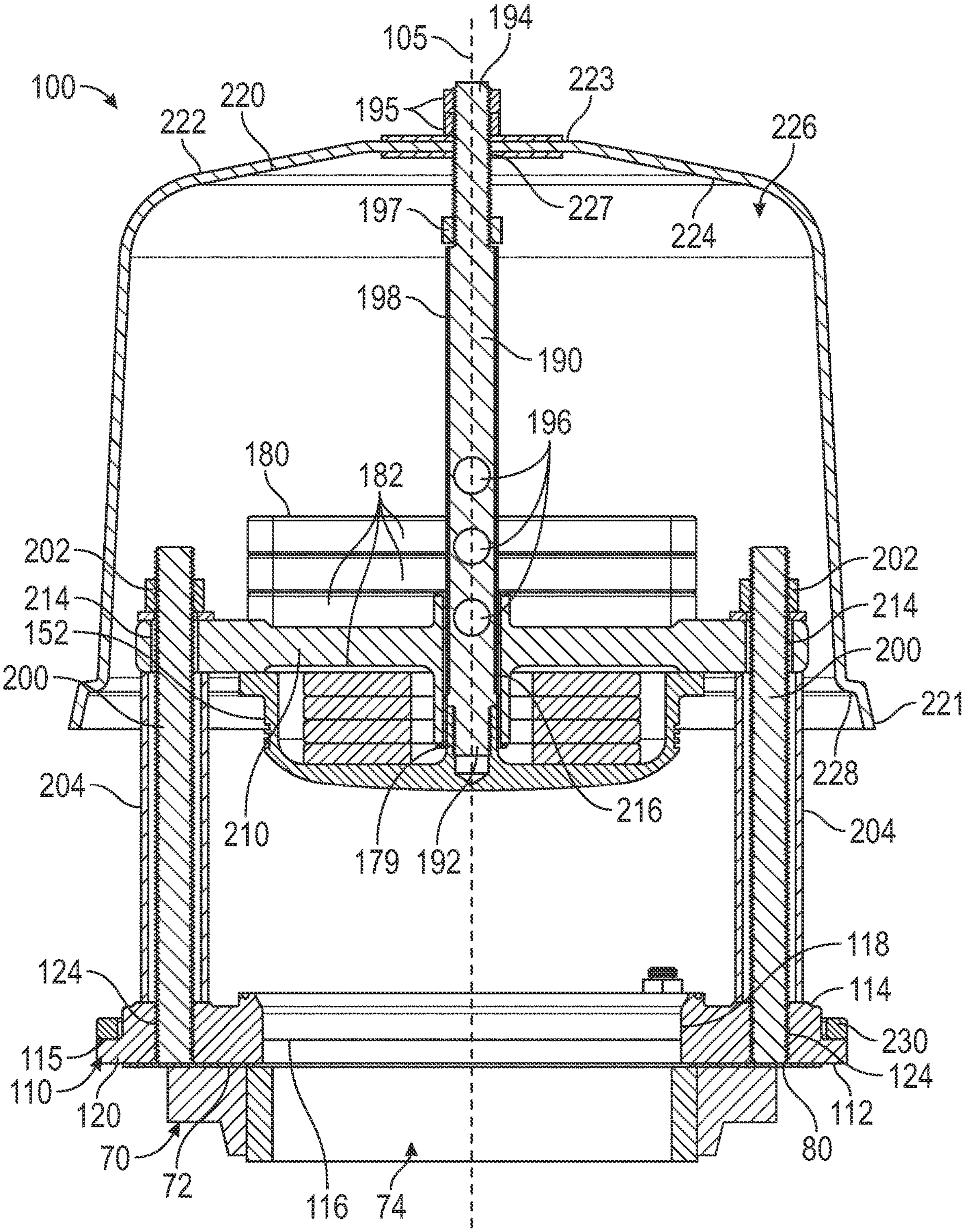
FIG. 6 is a side cross-sectional view of the thief hatch of FIG. 3 in an open position.

Referring now to FIGS. 3-5, an embodiment of a thief hatch 100 is shown. Thief hatch 100 shown in FIGS. 3-5 may comprise or define the thief hatch 50 shown in FIGS. 1 and 2; however, it may be understood that thief hatch 100 may comprise a component of pressure vessel systems that differ in configuration from the pressure vessel system 10 shown in FIGS. 1 and 2. In this exemplary embodiment, thief hatch 100 has a vertically oriented central or longitudinal axis 105 and generally includes an annular seal flange 110, a venting hatch 150, and a dome-shaped debris cover or weather cap 220. As shown in FIGS. 3-5, thief hatch 100 is secured to an annular tank flange 70 of a pressure vessel (e.g., a pressure vessel similar in configuration to the pressure vessel 20 shown in FIGS. 1 and 2), where the tank flange 70 comprises an annular flanged interface 72 and defines a central bore or passage 74 in fluid communication with an interior cavity of the pressure vessel.

In this exemplary embodiment, the seal flange 110 of thief hatch 100 has a first or lower end 112, a second or upper end 114 longitudinally opposite the lower end 112, and a central bore or passage 116 defined by a generally cylindrical, radially inner surface 118 extending between ends 112 and 114. The lower end 112 of seal flange 110 includes an annular support surface 120 positioned directly against and opposite the flanged interface 72 of tank flange 70. In this exemplary embodiment, an annular gasket 80 is captured between the support surface 120 of seal flange 110 and the flanged interface 72 of tank flange 70 to seal the interface formed therebetween.

In this exemplary embodiment, the seal flange 110 also includes a plurality of fastener apertures 122 extending axially, entirely through the seal flange 110 and spaced circumferentially about the central passage 116 thereof. A plurality of threaded fasteners (not shown in FIGS. 3-5) are inserted through fastener apertures 122 of seal flange 110 and a corresponding plurality of fastener apertures formed in the flanged interface 72 of tank flange 70 to thereby releasably couple and secure the seal flange 110 of thief hatch 100 to the flanged interface 72 of tank flange 70. However, it may be understood that in other embodiments mechanisms other than threaded fasteners extending between the seal flange 110 and tank flange 70 may be used to secure the thief hatch 100 to the tank flange 70. In addition to fastener apertures 122, seal flange 110 includes a plurality of rod apertures 124 extending axially, entirely through the seal flange 110 and spaced circumferentially about the central passage 116 thereof. The rod apertures 124 are circumferentially offset from the fastener apertures 122.

As shown particularly in FIG. 5, the radially inner surface 118 of seal flange 110, in this exemplary embodiment, includes a cylindrical section 126 extending from the lower end 112, a frustoconical tapered section 128 extending from the cylindrical section 126 towards the upper end 114, and a frustoconical section 130 extending from the tapered section 128 to the upper end 112 of seal flange 110. The tapered section 128 of inner surface 118 defines a tapered seal bore of the seal flange 110 and gradually reduces in diameter moving axially downward from a first or upper end of the tapered section 128 towards a second or lower end of the tapered section 128 where the lower end of tapered section 128 is located longitudinally between the upper end of tapered section 128 and the lower end 112 of seal flange 110. In other words, tapered section 128 tapers in the direction of the lower end 112 of seal flange 110, with the diameter of the upper end of tapered section 128 being greater than the diameter of the lower end of tapered section 128.

In this exemplary embodiment, the tapered section 128 of inner surface 118 tapers in accordance with a non-zero taper angle 129 formed between the tapered section 128 and a vertical axis extending parallel to central axis 105. In some embodiments, taper angle 129 is between approximately 0.5° and 10°. In some embodiments, taper angle 129 is between approximately 1° and 9°. In some embodiments, taper angle 129 is between approximately 2° and 8°. In some embodiments, taper angle 129 is between approximately 3° and 7°. It may be understood however that the magnitude of taper angle 129 may vary from the ranges provided herein in at least some embodiments. The frustoconical section 130 of inner surface 118 is also inclined or disposed at a non-zero angle relative to the central axis 105 of thief hatch 100. Particularly, frustoconical section 130 is inclined to a greater degree than the tapered section 128, and thereby forms an annular opening or relief 131 as will be discussed further herein.

The venting hatch 150 actuates and transitions the thief hatch 100 between its respective closed and open configurations and, in this exemplary embodiment, generally includes a dome-shaped piston 152, a biasing member or element 180, a centering rod 190, a pair of clamping rods or studs 200, and a crossbar 210. In this exemplary embodiment, the piston 152 of venting hatch 150 is positioned along and coaxially aligned with the central axis 105. In addition, the piston 152 has a first or lower end 153, a second or upper end 155, an outer surface 154 extending from lower end 153 to upper end 155, and an inner surface 156 extending from upper end 155 toward lower end 153. The piston 152 is generally cup-shaped, and thus, the inner surface 156 defines a recess or cavity extending from upper end 155 and the outer surface 154 defines the lower end 155 of the piston 152.

As shown particularly in FIG. 5, the radially outer portion of the outer surface 154 of piston 152 defines a generally cylindrical sealing surface along which a pair of annular seal assemblies 158 are positioned. Annular seal assemblies 158 are each positioned and configured to seal against the tapered section 128 of the inner surface 118 of seal flange 110 when thief hatch 100 is in the closed configuration. Each seal assembly 158 includes an annular seal groove 160 formed in the outer surface 154 of piston 152 and an annular seal 165 seated in the corresponding seal groove 160. It should be appreciated that a radially outer portion of each annular seal 165 may extend radially from the corresponding seal groove 160.

In this exemplary embodiment, the seal groove 160 of each seal assembly 158 has a groove width 161 that varies moving from a radially inner terminal end or base 162 of the seal groove 160 to a radially outer opening 164 of the seal groove 160 opposite the base 162. It may be understood that while opening 164 is located radially between the base 162 and a radially opposing terminal end of the seal groove 160 opposite base 162, the opening 164 of seal groove 160 need not be located at the opposing terminal end of seal groove 160. The width 161 of the seal groove 160 generally decreases or pinches inwardly moving from the base 162 of the seal groove 160 to the opening 164 such that the width 161 of the base 162 is greater than the width 161 of the opening 164. In this configuration, the opening 164 of the seal groove 160 is pinched or reduced so as to pinch against or compress the seal 165 received therein to better retain the seal 165 of seal assembly 158 within the seal groove 160 such that seal 165 is not entirely extruded from the seal groove 160 due to friction between the seal 165 and the inner surface 118 of seal flange 110 as the thief hatch 100 actuates between the open and closed configurations. In some embodiments, a ratio of the width 161 of the opening 164 of each seal groove 160 to the width 161 of the base 162 of each seal groove 160 is approximately between 1.1:1 and 1.6:1. In certain embodiments, the ratio of the width 161 of the opening 164 of each seal groove 160 to the width 161 of the base 162 of each seal groove 160 is approximately between 1.2:1 and 1.5:1. It may also be understood that in at least some embodiments seal grooves 160 may comprise conventionally shaped seal grooves receiving the seals 165 of seal assemblies 158.

The seals 165 of seal assemblies 158 sealingly contact both the outer surface 154 of piston 152 and the inner surface 118 of seal flange 110 to seal the annular interface formed there between when thief hatch 100 is in the closed configuration. More specifically, each seal 165 forms a static seal with the piston 152 and a dynamic or sliding seal with the inner surface 118. In this exemplary embodiment, seals 165 each comprise a “quad ring” or X-ring seal having an X-shaped cross-sectional profile including a plurality of circumferentially spaced lobes 166 disposed at a non-zero angle (e.g., approximately 90° apart) from each other. In this configuration, a pair of the lobes 166 of each X-ring seal 165 is received in a corresponding seal groove 160 while an outer pair of lobes 166 of each X-ring seal 165 is located exterior the seal groove 160 and in sealing contact with the inner surface 118 of seal flange 110 when thief hatch 100 is in the closed configuration.

In this manner, unlike O-ring seals and other annular seals, each individual X-ring seal 165 provides a dual seal barrier in the form of the outer pair of lobes 166 each in sealing contact with the inner surface 118 of seal flange 110 when thief hatch 100 is in the closed configuration. An additional advantage of X-ring seals 165 over at least some other annular seals (e.g., O-rings) is that the parting lines formed during the process of molding the X-ring seal 165 lie in a plane located between the inner pair of lobes 166 and the outer pair of lobes 166, and thus do not undesirably contact the inner surface 118 of seal flange 110 which could otherwise lead to a leak.

In at least some embodiments X-ring seals 165 may provide advantages over other types of annular seals such as O-ring seals in that X-ring seals 165 require a lesser amount of contact pressure or “squeeze” in order to effectively seal a given interface (e.g., the interface between piston 152 and seal flange 110) than O-ring seals, resulting in less frictional drag during movement of piston 152 and less wear to the X-ring seals 165 themselves, providing the X-ring seals 165 with a relatively longer service or operational life than other seals such as O-ring seals. For example, each X-ring seal 165 has a first or “unsqueezed” width corresponding to the radial width of the X-ring seal 165 in an unsqueezed, uncompressed, relaxed state with no external forces (beyond ambient air pressure) applied to the X-ring seal 165, and a second, compressed, or "squeezed" width that is less than the unsqueezed width and which corresponds to the radial width of X-ring seal 165 when the X-ring seal 165 is radially squeezed and compressed with the thief hatch 100 is in the closed configuration. In some embodiments, a ratio of the squeezed width to the unsqueezed width is between 0.900:1 and 0.995:1. In certain embodiments, the ratio of the squeezed width to the unsqueezed width is between 0.950:1 and 0.999:1.

Minimizing frictional drag may be of particular importance in some applications given that the maximum operating pressure within at least some pressure vessels may be relatively low, requiring the thief hatch 100 to actuate into the open configuration in response to a relatively minimal actuation pressure applied to the piston 152. For example, in some embodiments, thief hatch 100 is configured to actuate from the closed configuration to the open configuration in response to the application of a fluid pressure against the piston 152 that is less than five pounds per square inch (PSI). In some embodiments, thief hatch 100 is configured to actuate from the closed configuration to the open configuration in response to the application of a fluid pressure against the piston 152 that is less than one PSI. Given the relatively small, limited actuation pressure, reducing frictional drag between the piston 152 and seal flange 110 (along with minimizing frictional drag between other components of thief hatch 100) may be beneficial to ensure the proper operation of thief hatch 100.

In addition to seal assemblies 158, in this exemplary embodiment, an annular wiper assembly 170 is positioned along the outer surface 154 of piston 152. Particularly, wiper assembly 170 is axially positioned between the pair of seal assemblies 160 and a lower end 153 of the piston 152 such that wiper assembly 170 contacts the inner surface 118 of seal flange 110 prior to seal assemblies 160 when the thief hatch 100 is actuated from the open configuration to the closed configuration. Annular wiper assembly 170 is configured to wipe or clean the inner surface 118 of seal flange 110 when thief hatch 100 is actuated from the open configuration to the closed configuration. In this manner, wiper assembly 170 may prevent foreign debris or other materials from collecting on the inner surface 118 and interfering with the seal formed by seal assemblies 160 described above. Additionally, wiper assembly 170 may also act as bumper to help prevent the piston 152 from scratching or otherwise damaging the inner surface 118 of the seal flange 110 which could otherwise result in the formation of a leak.

Each wiper assembly 170 includes an annular wiper groove 172 formed in the outer surface 154 of piston 152 and an annular wiper element 174 seated in the corresponding wiper groove 172. It should be appreciated that a radially outer portion of the annular wiper element 174 may extend radially from the corresponding annular wiper groove 172. In this exemplary embodiment, wiper groove 172 has a pinched configuration similar to seal grooves 160 described above. In this exemplary embodiment, wiper element 174 comprises an X-ring seal which may be configured similarly as X-ring seals 165 described above. However, it may be understood that in other embodiments wiper element 174 may comprise an O-ring seal or other annular elastomeric member. Additionally, in still other embodiments, wiper assembly 170 may only include wiper groove 172 but not wiper element 174. Further, wiper element 174 may have a greater outer diameter (OD) than the X-ring seals 165 of seal assemblies 160 to assist wiper element 174 in wiping the entirety of the tapered section 128 of inner surface 118.

In addition to seal assemblies 160 and wiper assembly 170, a further annular seal assembly 175 is positioned between the upper end 114 of seal flange 110 and the outer surface 154 of piston 152 to seal the interface formed therebetween. The seal assembly 175 may also act as a bumper cushioning the impact between the piston 152 and the seal flange 110 as the thief hatch 100 actuates into the closed configuration. For convenience, seal assemblies 160 may be referred to as lower seal assemblies 160 and seal assembly 175 may be referred to as upper seal assembly 175 herein. In this exemplary embodiment, upper seal assembly 175 is positioned on the upper end 114 of seal flange 110, but it may be understood that in other embodiments upper seal assembly 175 may be positioned along or in the outer surface 154 of piston 152. Additionally, upper seal assembly 175 includes an annular seal groove 176 formed in the upper end 114 of seal flange 110 in this exemplary embodiment, and an annular seal 178 seated in the corresponding seal groove 176. In this exemplary embodiment, seal 178 comprises an O-ring seal rather than an X-ring seal given that, unlike X-ring seals 165 described above, seal 178 does not slide along a corresponding sealing surface when thief hatch 100 is actuated between the open and closed configurations, and thus, is less likely to be extruded from its corresponding seal groove 176. However, it may be understood that the configuration of seal 178 may vary in other embodiments.

As shown particularly in FIG. 4 and noted above, the inner surface 156 of piston 152 defines a central recess or cavity extending from upper end 155 of the piston 152. The biasing element 180 of venting hatch 150 is partially received within the central recess of the piston 152. In this exemplary embodiment, biasing element 180 comprises a stack of separate weights 182 that flank and partially surround the centering rod 190. At least some of the weights 182 may be half-moon shaped and sit atop a vertically upper end or lip of the piston 152 while other weights (e.g., donut or circular-shaped weights) may be received in a central opening or receptacle formed in piston 152; however, it may be understood that the configuration of weights 182 may vary depending on the given application. In this configuration, weights 182 apply (via gravity) an axially directed biasing force to the piston 152 urging the piston 152 downwards towards a closed position corresponding to the closed configuration of thief hatch 100. As will be discussed further herein, the downwards biasing force applied by weights 182 is resisted by an opposing, upwards and axially directed pressure force from fluid pressure within the pressure vessel to which thief hatch 100 is coupled.

In this exemplary embodiment, the magnitude of the biasing force applied by biasing element 180 corresponds to the total weight of the plurality of weights 182. Thus, the degree of biasing force applied by biasing element 180 may be easily and conveniently adjusted (e.g., to match the maximum operating pressure or other predefined threshold pressure) by adding or removing individual weights 182 from biasing element 180 to correspondingly increase or decrease the total weight of the plurality of weights 182. However, it may be understood that the configuration of biasing element 180 may vary in other embodiments. For example, in some embodiments, a mechanical spring or similar mechanism may be used for applying the necessary biasing force against piston 152. Alternatively, a pneumatic, fluid, or electromechanical element may be utilized alone or in combination with a weight or weight stack for biasing the piston 152 as required by the given application.

The centering rod 190 of venting hatch 150 maintains coaxial alignment of the central axis of seal flange 110, the central axis of piston 152, and the central axis 105 of thief hatch 100. As discussed above, minimizing frictional drag between the piston 152 and seal flange 110 may be important to the operability of thief hatch 100 in at least some embodiments, where friction between piston 152 and seal flange 110 may only be minimized if in-turn misalignment between the central axes of piston 152 and seal flange 110 is minimized, such as by centering rod 190 in this exemplary embodiment.

Centering rod 190 is elongate in shape and extends between a first or lower end 192 and a second or upper end 194 longitudinally opposite the lower end 192. In this exemplary embodiment, the lower end 192 of centering rod 190 is threaded to a corresponding receptacle 179 formed in the inner surface 156 of piston 152, coupling the centering rod 190 with the piston 152 whereby the centering rod 190 extends above the piston 152 opposite the tank flange 70. In other embodiments, a variety of mechanisms may be used to couple the centering rod 190 with piston 152 and which vary from the threaded arrangement shown in FIG. 4. In still other embodiments, centering rod 190 may be formed integrally or monolithically with the piston 152. Additionally, in this exemplary embodiment, a pair of fasteners or jam nuts 195 are threaded onto the upper end 194 of centering rod 190. Jam nuts 195 retain the weather cap 220 of thief hatch 100 to the venting hatch 150 thereof such that weather cap 220 is not ejected from the venting hatch 150 when thief hatch 100 is actuated from the closed configuration to the open configuration. Particularly, jam nuts 195 serve to delimit the degree of upwards axial travel of weather cap 220 relative to centering rod 190 during the operation of thief hatch 100. Additionally, another jam nut 197 is threaded onto the centering rod 190 below the jam nuts 195 to delimit the degree of downwards axial travel of weather cap 220 relative to centering rod 190 during the operation of thief hatch 100. For convenience, jam nuts 195 may be referred to as upper jam nuts 195 and jam nut 197 may be referred to as lower jam nut 197 herein. It may, however, be understood that alternative mechanisms may be used to secure the weather cap 220 to the venting hatch 150 in other embodiments.

In this exemplary embodiment, centering rod 190 additionally includes a plurality of axially spaced maintenance holes or apertures 196 extending radially therethrough. Thief hatch 100 may be maintained in the open configuration by inserting an elongate member or pin through one of the maintenance apertures 196 such that piston 152 is locked into an upper position (opposite the lower position of piston 152 described above) providing access to the lower seal assemblies 160 and wiper assembly 170 of piston 152. It may be understood that in at least some embodiments the centering rod 190 may not include maintenance apertures 196. Further, in this exemplary embodiment, a friction reduction sleeve 198 is positioned along at least a portion of the centering rod 190 to reduce frictional drag between the centering rod 190 and the crossbar 210 when thief hatch 100 is actuated between the open and closed configurations. Friction reduction sleeve 198 may comprise a variety of low friction, low adhesion materials such as Teflon and the like. The low adhesion quality of the material comprising friction reduction sleeve 198 may prevent or at least inhibit foreign debris (dirt, frost, ice, etc.) from collecting on a radially outer surface of the friction reduction sleeve 198 which may otherwise increase frictional drag between the centering rod 190 and crossbar 210.

The crossbar 210 provides structural support to the centering rod 190 by coupling the centering rod 190 to the seal flange 110 through the pair of support rods or clamping studs 200 such that the central axis of centering rod 190 is maintained in coaxial alignment with central axis 105 of thief hatch 100. In this exemplary embodiment, crossbar 210 is elongate in shape extending between a pair of longitudinally opposed outer ends and includes a pair of outer receptacles 214 and a central receptacle 216 positioned equidistantly between the pair of outer receptacles 214. The friction reduction sleeve 198 along with the centering rod 190 received therein each extend axially through the central aperture 216 of crossbar 210. In some embodiments, either end of the central aperture 216 of crossbar 210 receives a friction reducing bushing for reducing friction between the crossbar 210 and the centering rod 190. Fasteners or nuts 202 are threaded onto upper ends of the clamping studs 200 to engage an upper end of the crossbar 210 while guide sleeves 204 are positioned around at least a portion of the clamping studs 200 to support a lower end of the crossbar 210, thereby restricting relative movement between clamping studs 200 and the crossbar 210. It may be understood that a variety of mechanisms may be utilized for securing the crossbar 210 to the clamping studs 200 which vary from the configuration shown in FIGS. 3 and 4.

The weather cap 220 of thief hatch 100 assists in preventing or at least inhibiting foreign debris and other materials from entering the thief hatch 100 during the operational life thereof. Weather cap 220 extends between an open bottom or lower end 221 and an enclosed top or upper end 223 axially opposite the lower end 221. Additionally, weather cap 220 generally includes an exterior or external surface 222 and an interior or internal surface 224. Internal surface 224 extends axially upward from lower end 221 toward upper end 223, thereby defining an internal chamber 226 of the weather cap 220 within which the venting hatch 150 is at least partially received. The upper end 223 of weather cap 220 is positioned or trapped between the pair of upper jam nuts 195 and the lower jam nut 197 thereby coupling and securing the weather cap 220 to the centering rod 190 where the centering rod 190 extends through an annular gasket 227 located at the upper end 223 of the weather cap 220 to seal the interface formed therebetween and prevent moisture from entering the internal chamber 226. Weather cap 220 may also provide insulation by blocking solar radiation as well as trapping air within internal chamber 226 to mitigate variations in temperature to which components of the thief hatch 100 (including elastomeric and other elements sensitive to substantial temperature changes) are exposed during operation.

In this exemplary embodiment, the internal surface 224 of weather cap 220 defines an annular lip 228 located proximal the lower end 221 of weather cap 220. An annular breathable gasket 230 is positioned between the lip 228 of weather cap 220 and a corresponding annular shoulder 115 formed on the upper end 114 of seal flange 110. In this configuration, lip 228 of weather cap 220 may press downwardly against an upper surface of the breathable gasket 230 while the shoulder 115 presses upwardly against an opposing lower surface of the breathable gasket 230. Additionally, the lip 228 hangs or drapes over the seal flange 110 to protect the seal flange 110 from the external environment including snow or ice that could otherwise buildup on seal flange 110 without the presence of lip 228. In this configuration, the lip 228 of weather cap 220 presses down and contacts the breathable gasket 230 while the shoulder 115 of seal flange 110 presses upwards and contacts an opposing side of breathable gasket 230 when thief hatch 100 is in the closed configuration, thereby preventing or at least inhibiting foreign debris or other materials from entering the internal chamber 226 of weather cap 220 from the external environment. At the same time, breathable gasket 230 is configured to allow gasses to communicate between the internal chamber 226 of weather cap 220 and the external environment such that fluid pressure is not allowed to inadvertently and undesirably build within the internal chamber 226 of weather cap 220.

Referring now to FIGS. 3-6, having discussed structural features of the thief hatch 100, a brief description of one exemplary mode for operating the thief hatch 100 will now be described. Particularly, with the thief hatch 100 coupled to an opening (e.g., a tank flange) of a pressure vessel, thief hatch 100 may be actuated from the closed configuration shown in FIGS. 3 and 4 to the open configuration shown in FIG. 6. Particularly, actuation of the thief hatch 100 is initiated by the application of a pressure or actuation force against the lower end of the piston 152, wherein the fluid pressure associated with the actuation force is less than five PSI, and in some instances, less than one PSI. The X-ring seals 165 of seal assemblies 158, having a minimal squeeze ratio, permit the thief hatch 100 to successfully actuate from the closed configuration to the open configuration in response to such a minimal actuation force by minimizing frictional drag against the inner surface 118 of seal flange 110. It may be understood that friction reduction sleeve 198 also serves to minimize frictional drag during the actuation of thief hatch 100.

As the thief hatch 100 actuates from the closed configuration to the open configuration, the piston 152 travels axially upwards relative to the seal flange 110 from the closed position corresponding to the closed configuration to an open position corresponding to the open configuration. As the piston 152 travels upwards through the central passage 116 of seal flange 110, seal assemblies 158 unseal from the inner surface 118, permitting fluid from within the pressure vessel to flow through the annular interface formed between the outer surface 154 of piston 152 and the inner surface 118 of seal flange 110. Particularly, fluid is permitted to escape through the annular relief 131 formed by frustoconical section 130 of the inner surface 118 of seal flange 110, inhibiting the piston 152 from accelerating too rapidly as piston 152 travels towards the open position.

The thief hatch 100, upon actuating into the open configuration, may remain in the open configuration until the biasing force applied by biasing element 180 to the piston 152 exceeds the actuation force applied to the piston 152 by fluid pressure within the pressure vessel, permitting the piston 152 to fall axially downwards through the central passage 116 of seal flange 110 from the open position to the closed position. As the piston 152 travels downward through central passage 116, the wiper assembly 170 wipes or cleans the inner surface 118 of seal flange 110, including tapered section 128, preventing foreign debris or other materials from collecting on tapered section 128. It may be understood that the ability to wipe the tapered section 128 addresses one issue associated with conventional thief hatches which rely on a face seal with no relative sliding contact for cleaning the sealing surface. Additionally, with the thief hatch 100 returned to the closed configuration, breathable gasket 230 prevents foreign debris (e.g., solid particles and other matter) from entering the internal chamber 226 defined by weather cap 220, preventing this debris from potentially landing on sealing surfaces of the thief hatch 100 such as the tapered section 128 of the inner surface 118 of seal flange 110 while still permitting the internal chamber 226 to breath or otherwise communicate gasses between the internal chamber 226 and the external environment.

Figure 7:
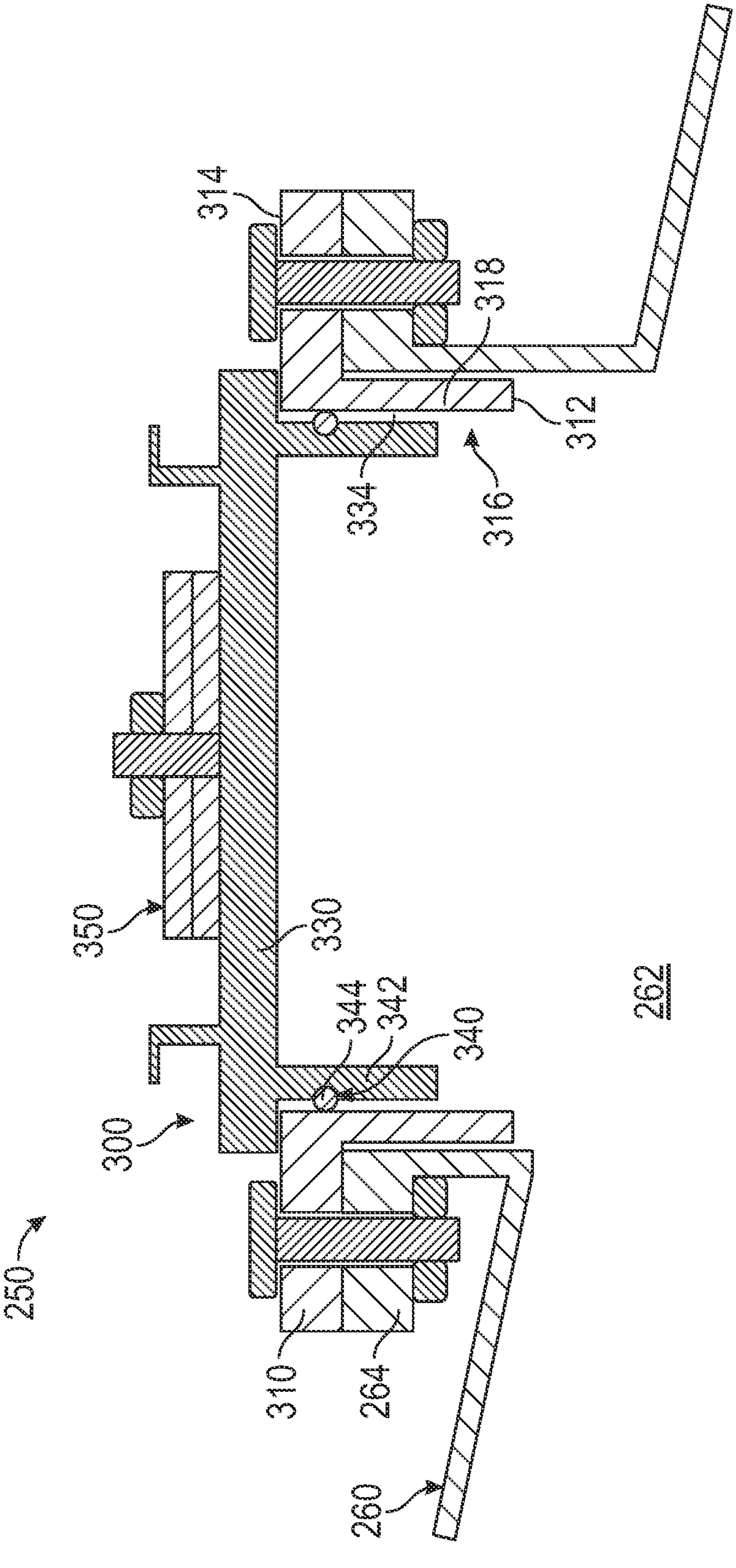
FIG. 7 is a schematic view of another embodiment of a pressure vessel system in accordance with principles described herein.

Referring now to FIG. 7, another embodiment of a pressure vessel system 250 is shown generally including a pressure vessel 260 (partially shown in FIG. 6) and a thief hatch 300 coupled therewith. The pressure vessel 250 defines an internal cavity 262 and comprising a flanged opening 264 in fluid communication with the internal cavity 262.

In this exemplary embodiment, thief hatch 300 simply includes an annular seal flange 310, a piston 330, and a biasing element 350. Seal flange 310 extends between a first or lower end 312 and a second or upper end 314 longitudinally opposite the lower end 312. Additionally, seal flange 310 comprises a central passage 316 defined by an inner surface 318 extending between the first end 312 and the second end 314, wherein the first end is attachable to the flanged opening 264 of pressure vessel 260. Piston 330 of thief hatch 300 is to the seal flange 310 and receivable in the central passage 316 of seal flange 310 and comprises an outer surface 332 defining an annular interface 334 between the outer surface 332 of the piston 330 and the inner surface 318 of the seal flange 310.

In this exemplary embodiment, an annular seal assembly 340 is located along the outer surface 332 of the piston 330, the seal assembly 340 comprising an annular seal groove 342 formed in the outer surface 332 of the piston 330 and an annular seal 344 at least partially received in the seal groove 342 and in sliding contact with the inner surface 318 of the seal flange 310. Additionally, biasing element 350 is coupled to the piston 330 and configured to apply a biasing force against the piston 330 to bias the piston towards a first position corresponding to a closed configuration of the thief hatch 300.

As with thief hatch 100 described above, thief hatch 300 includes the closed configuration (shown in FIG. 7) and an open configuration. Particularly, thief hatch 300 comprises the closed configuration in which the piston 330 occupies the first position with the seal 344 of the seal assembly 340 sealingly contacting the inner surface 318 of the seal flange 310 to seal the annular interface 334 between the outer surface 332 of the piston 330 and the inner surface 318 of the seal flange 310, and the open configuration in which the piston 330 occupies a second position in which the seal 344 of the seal assembly 340 is spaced from the inner surface 318 of the seal flange 310 to permit fluid communication through the annular interface 334.

Figure 8:
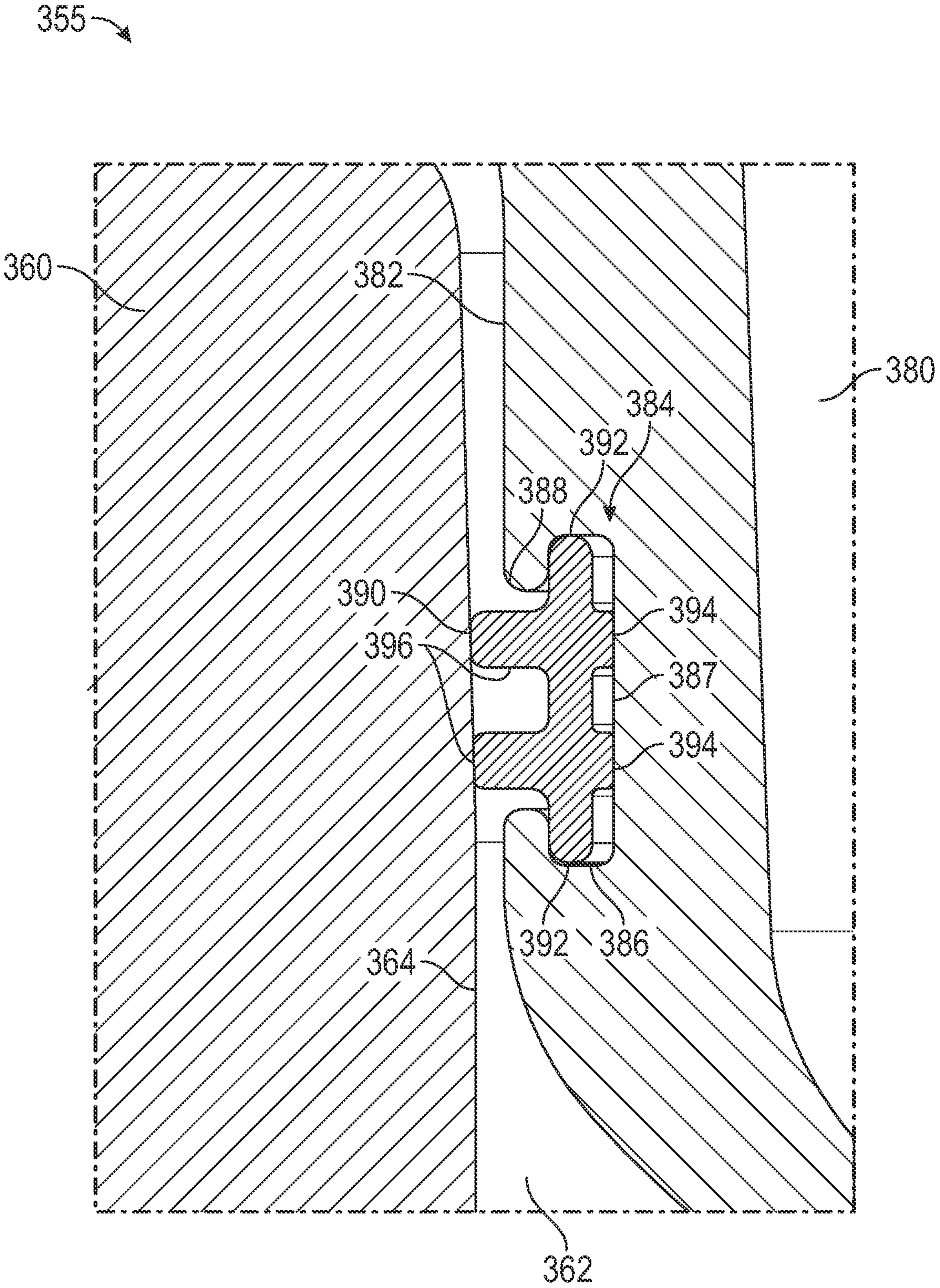
FIG. 8 is a partial side cross-sectional view of another embodiment of a thief hatch in accordance with principles described herein.

Referring now to FIG. 8, another embodiment of a thief hatch 355 for a pressure vessel system is partially shown. Particularly, FIG. 8 partially illustrates a seal flange 360 and a piston 380 of the thief hatch 355, it being understood that thief hatch 355 may include components in addition to seal flange 360 and piston 380 and that are not shown in FIG. 8. In this exemplary embodiment, seal flange 360 of thief hatch 355 includes a central bore or passage 362 defined by a radially inner surface 364 which may be tapered or non-tapered along its longitudinal length.

The piston 380 of thief hatch 355 includes an outer surface 382 along which an annular seal assembly 384 is positioned. Annular seal assembly 384 is positioned and configured to seal against the radially inner surface 364 of seal flange 360 when thief hatch 355 is in the closed configuration. Additionally, seal assembly 384 includes an annular seal groove 386 formed in the outer surface 382 of piston 380 and an annular seal 390 seated in the corresponding seal groove 386. In this exemplary embodiment, the seal groove 386 of seal assembly 384 has a groove width that varies moving from a radially inner terminal end or base 387 of the seal groove 386 to a radially outer opening 388 of the seal groove 386 opposite the base 387. In this configuration, the opening 388 of the seal groove 386 is pinched or reduced so as to pinch against or compress the seal 390 received therein to better retain the seal 390 of seal assembly 384 within the seal groove 386 such that seal 390 is not entirely extruded from the seal groove 386 during the operation of thief hatch 355.

In this exemplary embodiment, the seal 390 of seal assembly 384 comprises an irregularly-shaped (different in shape than the X-ring seals described above) annular sealing element having a pair of opposed lobes 392, a pair of radially inner lobes 394, and a pair of radially outer lobes 396. Opposed lobes 392 of seal 390 define a maximum width of the seal 390 (moving radially from the radially inner periphery to the radially outer periphery of the seal 390) which is greater than the width of the seal groove 386 at the opening thereof 388 such that interference between the opposed lobes 392 of seal 390 and a pair of annular shoulders formed by the opening 388 of seal groove 386 serves to retain the seal 390 at least partially within the seal groove 386. The pair of inner lobes 394 extend radially inwards towards and contact the base 387 of seal groove 386 while the pair of outer lobes 396 extend radially outwards towards the radially inner surface 364 of seal flange 360 whereby the pair of outer lobes 396 may contact the radially inner surface 364. In some embodiments, the pair of outer lobes 396 serve to clean or wipe the radially inner surface 364 of seal flange 360 during the operation of thief hatch 355. Thus, in at least some embodiments, seal 390 comprises a wiper element or seal. In other embodiments, the pair of outer lobes 396 may simply seal against the radially inner surface 364 of seal flange 360. Seal 395 of seal assembly 384 serves as an example of another type of annular seal which may be utilized with a variable width seal groove (e.g., seal groove 386).

Figure 9:
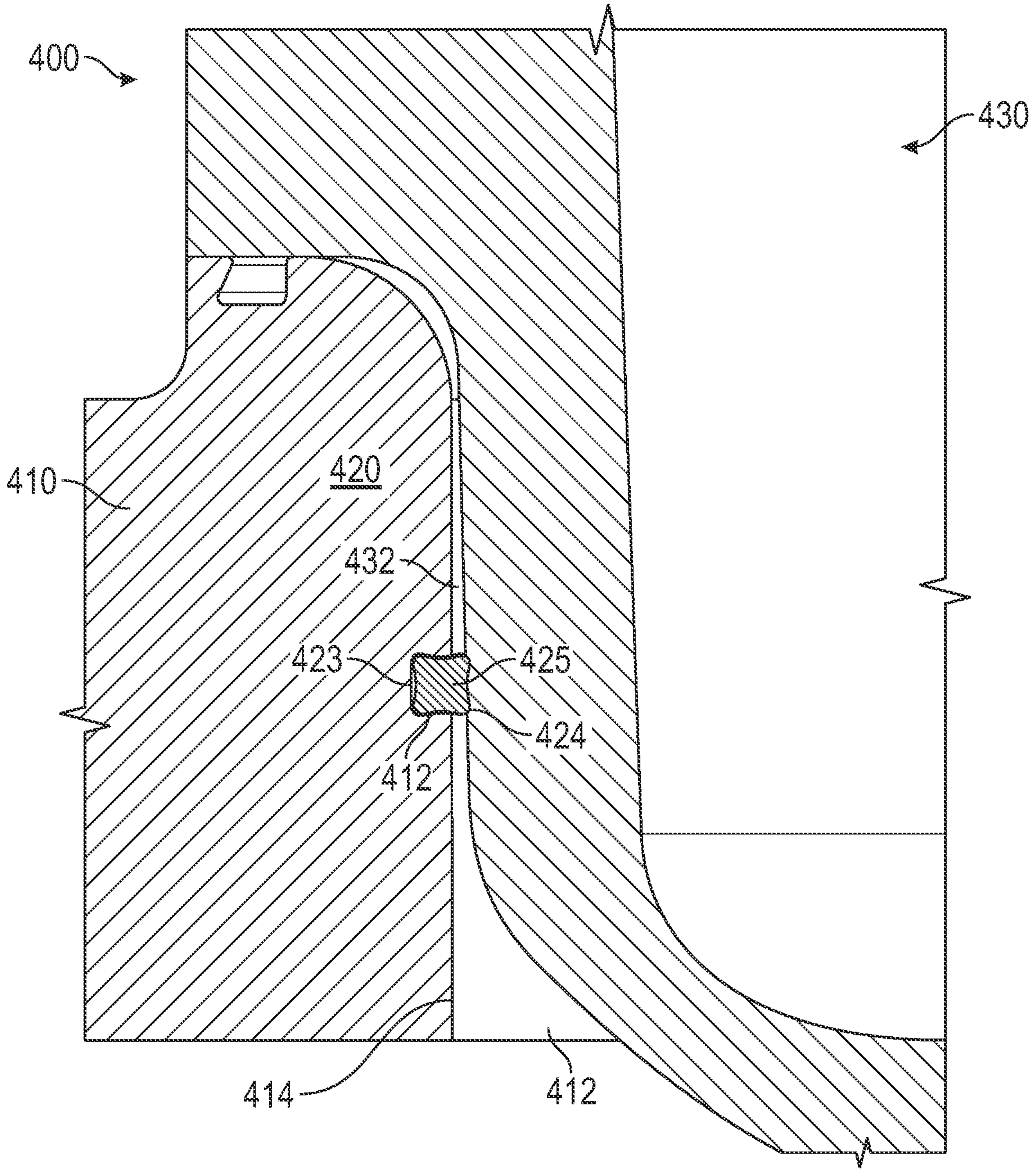
FIG. 9 is a partial side cross-sectional view of another embodiment of a thief hatch in accordance with principles described herein.

Referring now to FIG. 9, another embodiment of a thief hatch 400 for a pressure vessel system is partially shown. Particularly, FIG. 9 partially illustrates a seal flange 410 and a piston 430 of the thief hatch 400, it being understood that thief hatch 400 may include components in addition to seal flange 410 and piston 430 and that are not shown in FIG. 9. In this exemplary embodiment, seal flange 410 of thief hatch 400 includes a central bore or passage 412 defined by a radially inner surface 414 which may be tapered or non-tapered along its longitudinal length. Additionally, the piston 430 of thief hatch 400 includes an outer surface 432.

In this exemplary embodiment, an annular seal assembly 420 is positioned along the radially inner surface 414 of seal flange 410. Annular seal assembly 420 is positioned and configured to seal against the outer surface 432 of piston 430 when thief hatch 400 is in the closed configuration. In this configuration, seal assembly 420 demonstrates that the seal assembly of the thief hatch (e.g., thief hatch 400) responsible for sealing the interface formed between the seal flange and the piston thereof may be positioned along a surface of the seal flange and/or piston of the thief hatch. To state in other words, it is not critical whether the seal flange or the piston of the thief hatch carries the given seal assembly.

Seal assembly 420 includes an annular seal groove 422 formed in the radially inner surface 414 of seal flange 410 and an annular seal 425 seated in the corresponding seal groove 422. In this exemplary embodiment, the seal groove 422 of seal assembly 420 has a groove width that varies moving from a radially inner terminal end or base 423 of the seal groove 422 to a radially outer opening 424 of the seal groove 422 opposite the base 423. In this configuration, the opening 424 of the seal groove 422 is pinched or reduced so as to pinch against or compress the seal 425 received therein to better retain the seal 425 of seal assembly 420 within the seal groove 422 such that seal 425 is not entirely extruded from the seal groove 422 during the operation of thief hatch 400. Seal 425 is shown in FIG. 9 as comprising an X-ring seal; however, it may be understood that seal 425 may comprise types of annular seals other than X-ring seals.

Figure 10:
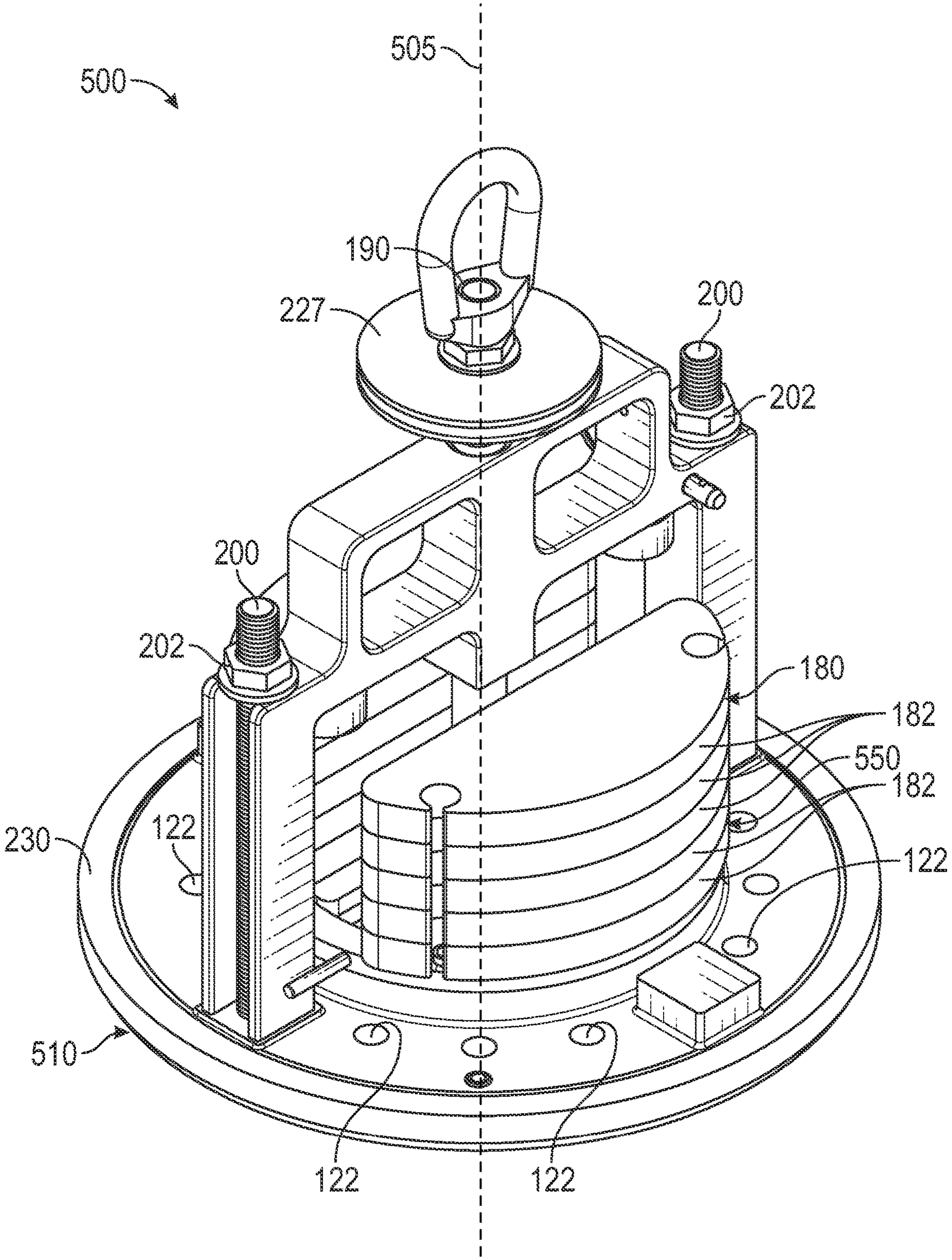
FIG. 10 is a perspective view of another embodiment of a thief hatch in accordance with principles described herein.

Referring to FIG. 10, another embodiment of a thief hatch 500 is shown. Thief hatch 500 includes features in common with the thief hatch 100 shown in FIGS. 3-6, and shared features are labeled similarly. In this exemplary embodiment, thief hatch 500 has a central or longitudinal axis 505 and generally includes an annular seal flange 510, a venting hatch 550, and the weather cap 220 (not shown in FIG. 10).

Figure 11:
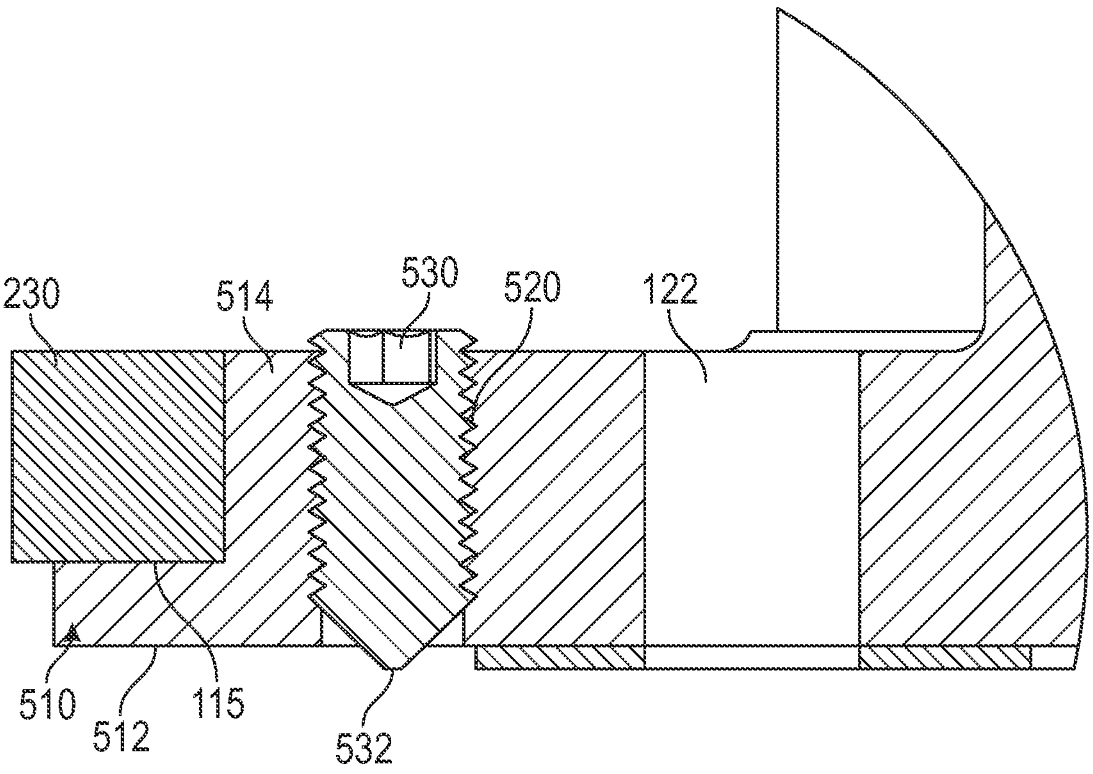
FIG. 11 is a zoomed-in, side cross-sectional view of an embodiment of a seal flange of the thief hatch of FIG. 10.

Referring to FIGS. 10 and 11, an additional view of the seal flange 510 is provided in FIG. 11. The seal flange 510 of thief hatch 500 generally includes a has a first or lower end 512, a second or upper end 514 longitudinally opposite the lower end 512, and central passage 516 defined by a generally cylindrical, radially inner surface 518 extending between ends 512 and 514. In this exemplary embodiment, seal flange 510 includes one or more receptacles 520 extending entirely between ends 512 and 514, and that receives an electrical grounding member 530 for electrically grounding the thief hatch 500 to the tank flange (e.g., tank flange 30 shown in FIGS. 1 and 2) of the corresponding tank to which thief hatch 500 is coupled.

Particularly, in some embodiments, thief hatch 500 comprises electrically conductive materials. For example, seal flange 510 along with other components of thief hatch 500 (e.g., venting hatch 550) comprise electrically conductive materials that are electrically connected together whereby an electrical signal path may be formed that extends through the electrically conductive components of thief hatch 500. This electrical signal path is electrically connected to the grounding member 530 such that the electrical signal path defines an electrical grounding path electrically connected, through the grounding member 530, to the tank to which the thief hatch 500 is coupled.

In this exemplary embodiment, the grounding member 530 comprises an externally threaded grounding pin or fastener that is releasably connected to the receptacle 520 which defines corresponding internal threads for threadably engaging the external threads of grounding member 530. However, the connection formed between grounding member 530 and receptacle 520 may vary from that shown in FIG. 11.

Additionally, in this exemplary embodiment, grounding member 530 comprises a pointed or conical (including frustoconical) end or tip 532 that projects from the lower surface of seal flange 510. The pointed tip 532 of grounding member pierces or bites into the tank flange (e.g., tank flange 30 shown in FIGS. 1 and 2) of the tank to which thief hatch 500 is coupled. In this manner, the pointed tip 532 of grounding member 530 may penetrate an exterior surface of the tank flange 30 to electrically connect the grounding member 530 with electrically conductive material of the tank flange located beneath the exterior surface thereof. For example, in some applications, the exterior surface of the tank flange (and other components of the given tank) may comprise an electrical insulator (e.g., in the form of a coating) that must be pierced by the grounding member 530 in order to establish an electrical connection between the tank flange and the grounding member 530.

Figure 12:
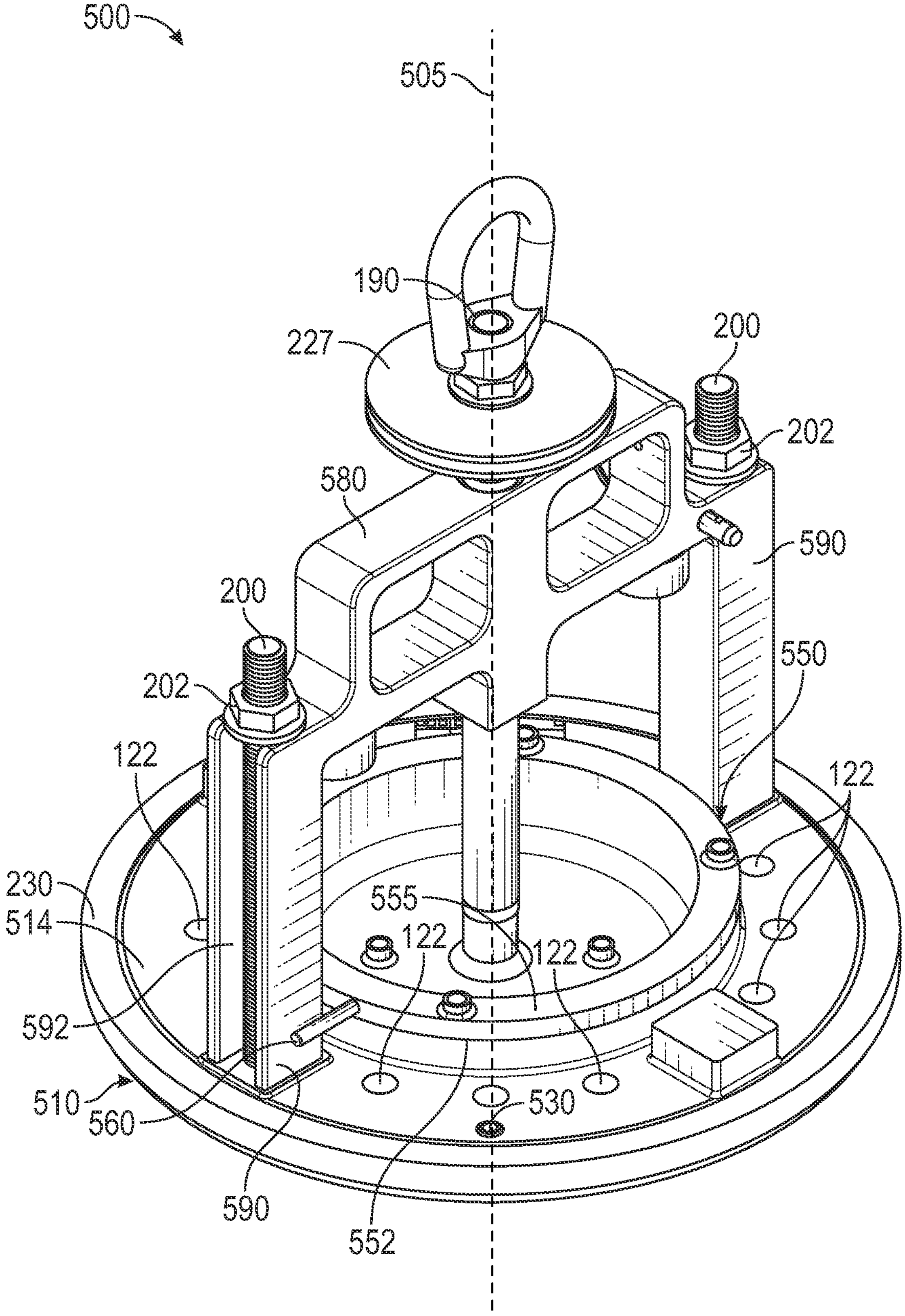
FIG. 12 is a perspective view of the thief hatch of FIG. 10 in a closed configuration.
Figure 13:
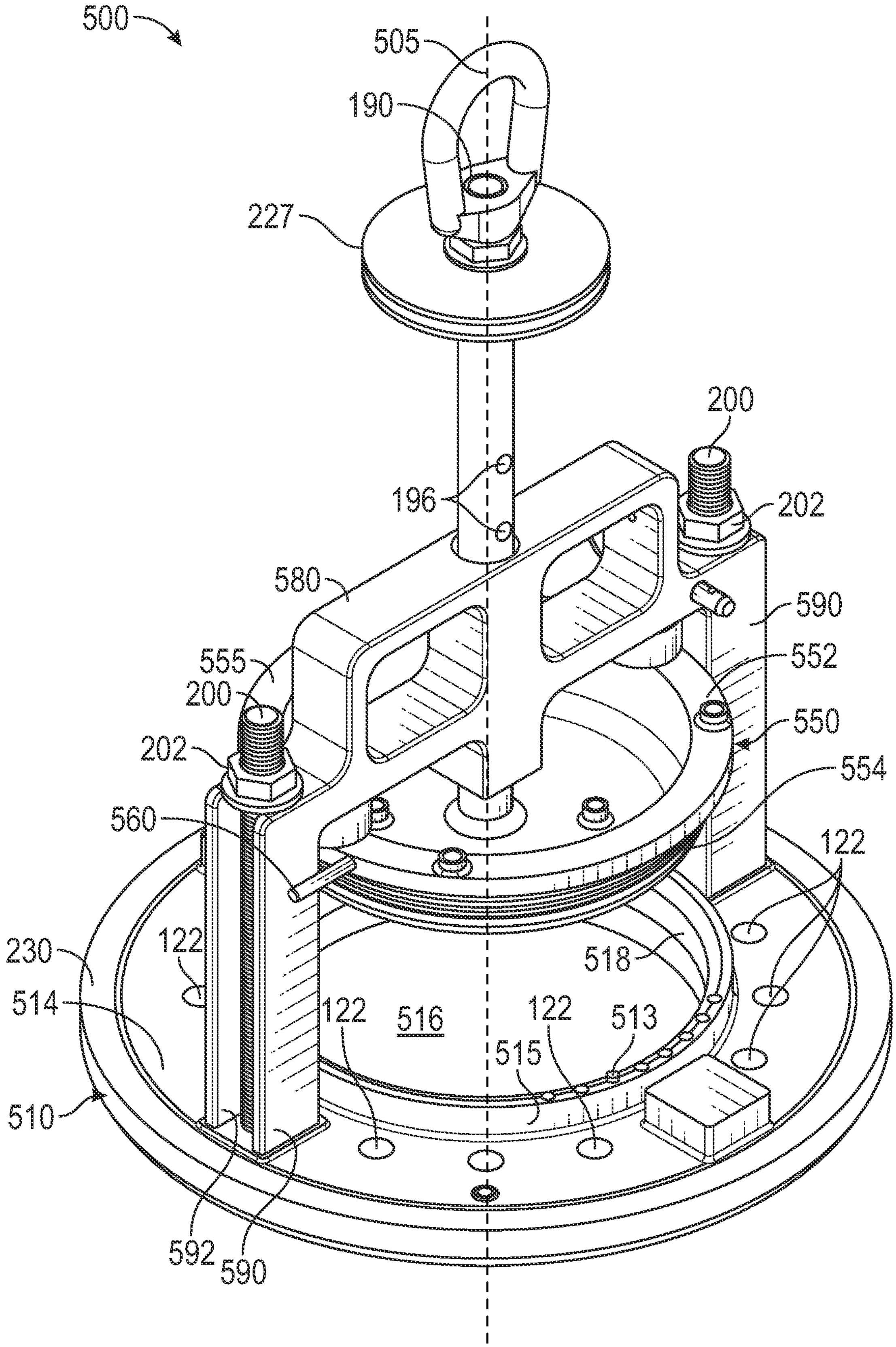
FIG. 13 is a perspective view of the thief hatch of FIG. 10 in an open configuration.
Figure 14:
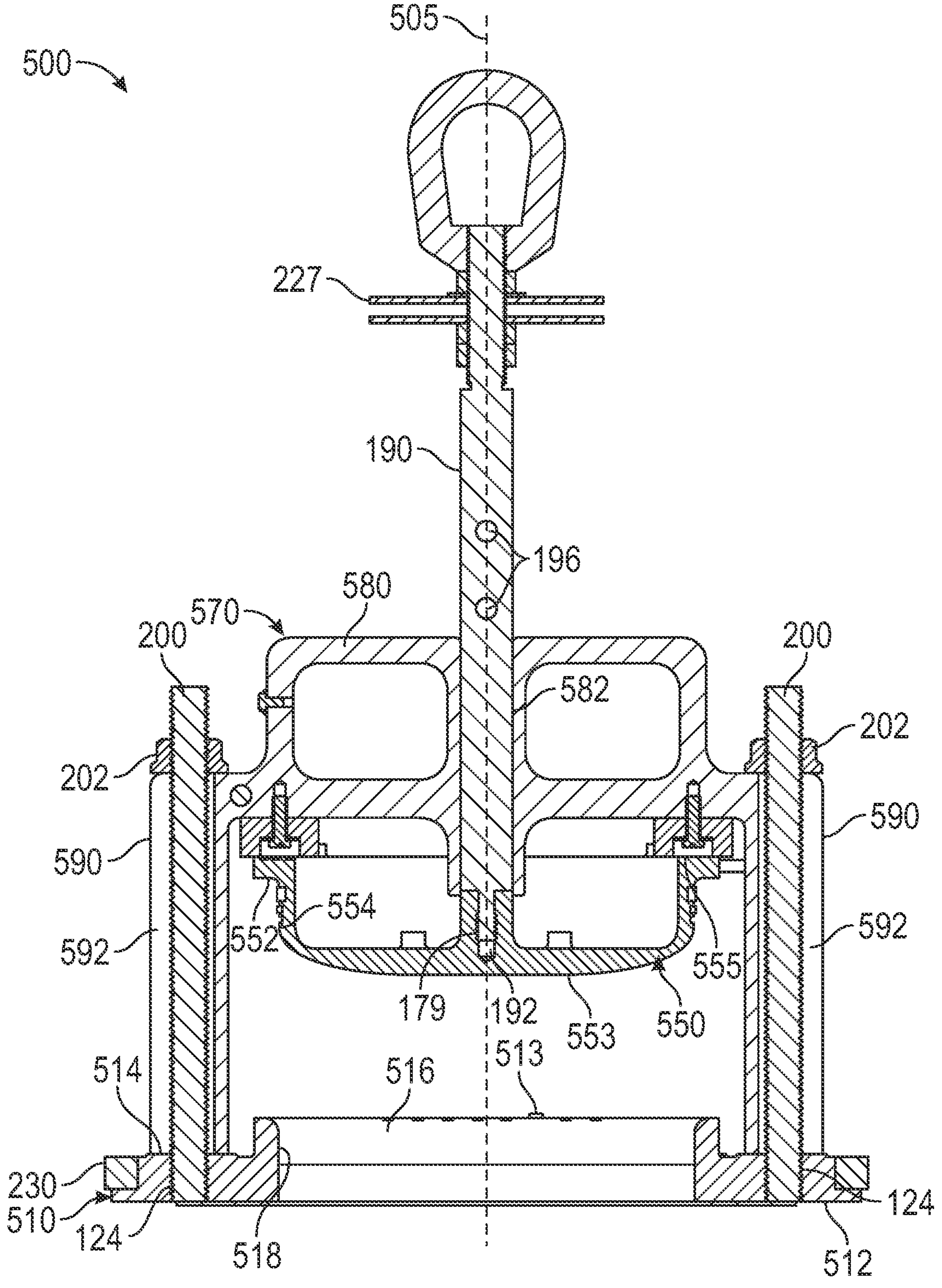
FIG. 14 is a side cross-sectional view of the thief hatch of FIG. 10.

Referring to FIGS. 12-14, the venting hatch 550 of thief hatch 500 actuates and transitions thief hatch 500 between a closed configuration (shown in FIG. 12) restricting fluid flow through the thief hatch, and an open configuration (shown in FIG. 13) permitting fluid flow through the thief hatch 500. Venting hatch 550 generally includes a dome-shaped piston 552, and a piston guide 570.

The piston 552 of venting hatch 550 has a first or lower end 553, a second or upper end 555, and an outer surface 554 extending from lower end 553 to upper end 555. As shown particularly in FIGS. 12 and 13, in this exemplary embodiment, piston 552 comprises one or more anti-rotation stops 560 located at the upper end 555 thereof. Particularly, anti-rotation stop 560 comprises a stop pin (and may also be referred to herein as anti-rotation pin 560) that projects radially outwards from piston 552. Particularly, anti-rotation pin 560 projects beyond the inner diameter of 516 such that anti-rotation pin 560 may contact one of a pair of support bars 590 of piston guide 570 to limit relative rotation between the piston 552 and the piston guide 570.

In addition, in this exemplary embodiment, seal flange 510 includes a vertical stop 513 that projects vertically upwards from a radially inner lip 515 of the seal flange 510 along the upper end 514 thereof. Vertical stop 513 comprises a stop pin (and may also be referred to herein as stop pin 513) configured to delimit vertical downwards travel of piston 552 relative to the seal flange 510. Particularly, as the piston 552 travels downwards towards a closed position (corresponding to the closed configuration of thief hatch 500), a radially outer lip of piston 552 lands against the vertical stop 513 of seal flange 510 thereby arresting and delimiting the downward travel of piston 552 relative to seal flange 510. In this manner, stop pin 513 precisely defines a lowermost position of the piston 552 relative to the seal flange 510. By precising controlling the lowermost position of piston 552 relative to seal flange 510, the degree of compression imparted to the seals of venting hatch 550 may be precisely controlled to maximize the sealing performance of the venting hatch 550 when the thief hatch 500 is in the closed configuration. In some embodiments, the axial position of stop pin 513 along piston 552 may be adjusted to adjust in turn the degree of compression imparted to the seals of venting hatch 550 as desired by a user of the thief hatch 500.

The piston guide 570 of venting hatch 550 physically supports the piston 552 and guides the piston 552 between its closed and open (corresponding to the open configuration of thief hatch 500) positions. Piston guide 570 generally includes a crossbar 580 and the pair of support bars 590. In this exemplary embodiment, piston guide 570 is a single-piece or monolithic such that crossbar 580 is integrally or monolithically formed with the pair of support bars 590. The monolithic piston guide 570 reduces tolerance stack up (which may result from the coupling of separately formed components) and improves the alignment and adjustability of the placement of the piston 552 relative to the seal flange 510. In addition, the monolithic piston may minimize the overall weight of piston guide 570.

The crossbar 580 of piston guide 570 defines a central, cylindrical receptacle 582 that receives the centering rod 190 of thief hatch 500. In some embodiments, the receptacle 582 defines or comprises a bearing in sliding engagement with the centering rod 190 and having a bearing length extending axially along central axis 505 between opposing upper and lower ends of the receptacle 582. In some embodiments, a coating may be applied to an inner surface defining receptacle 582 and/or the outer surface of centering rod 190 for minimizing friction between centering rod 190 and the inner surface of receptacle 582. This coating may, in lieu of or in addition to reducing drag friction, reduce ice adhesion of the centering rod 190 to the inner surface of the receptacle 582.

The bearing length of receptacle 582 may be predefined in relation to a stroke length of piston 552 corresponding to the distance along central axis 505 piston 552 travels between its respective open and closed positions. In some embodiments, venting hatch 550 is provided with a predefined bearing length to piston stroke ratio of approximately 1.1:1 to optimize the flow capacity of the thief hatch 500 while also ensuring proper alignment of piston 552 relative to seal flange 510 such that friction between piston 552 and seal flange 510 during opening of the thief hatch 500 is minimized. In turn, minimizing friction via the optimized bearing length to piston stroke ratio minimizes abrasion and wear to the piston 552 over the operational life of the thief hatch 500.

The support bars 590 of piston guide 570 extend from opposing longitudinal ends of the crossbar 580 to the upper end 514 of seal flange 510 such that piston guide 570 rests against upper end 514. Additionally, each support bar 590 includes an axially extending outer channel 592 which receives one of the clamping studs 200. In this arrangement, nuts 202 may clamp down against the opposing longitudinal ends of crossbar 580 thereby clamping the piston guide 570 against the upper end 514 of seal flange 510 to secure the piston guide 570 to the seal flange 510.

Figure 15:
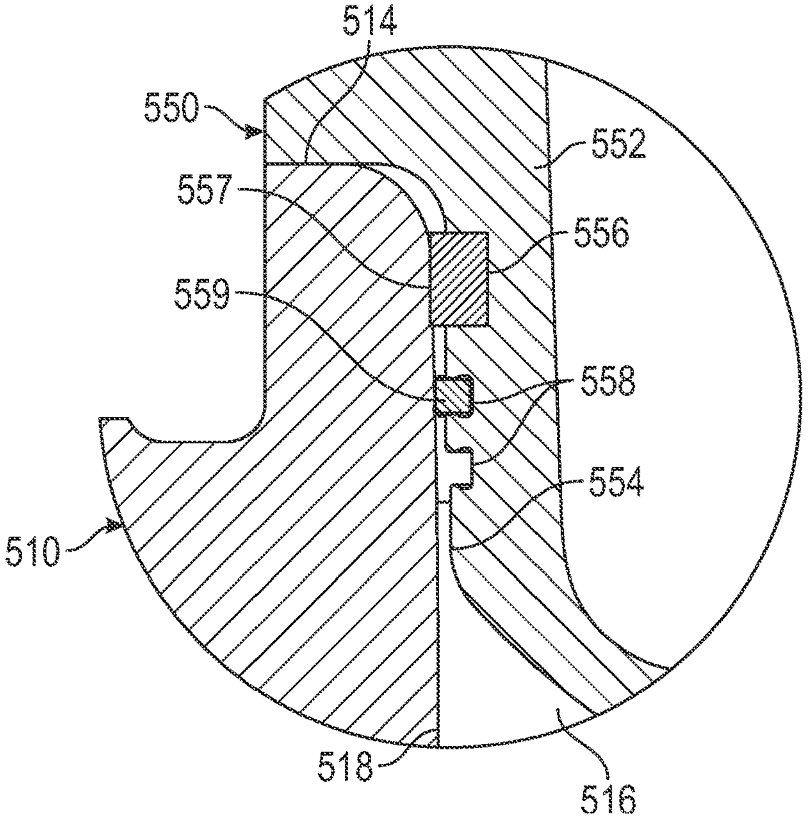
FIG. 15 is a zoomed-in, side cross-sectional view of an embodiment of a piston of the thief hatch of FIG. 10.

Referring now to FIG. 15, in this exemplary embodiment, an annular applicator groove 556 and one or more annular seal grooves 558 are formed in the outer surface 554 of piston 552. The applicator groove 556 receives an applicator ring 557 in sliding contact with the inner surface 518 of seal flange 510. Additionally, the one or more seal grooves 558 may receive corresponding annular seals 559 (e.g., x-Rings, O-rings, and the like) for sealing the annular interface formed between the outer surface 554 of piston 552 and the inner surface 518 of seal flange 510 when piston 552 is in the closed position.

In this exemplary embodiment, applicator ring 557 comprises an absorbent material impregnated with a lubricant that is released gradually over time and applied by the applicator ring 557 to the inner surface 518 of seal flange 510. In this manner, the surface friction of inner surface 518 may be minimized thereby minimizing friction between seal 559 and the inner surface 518 of seal flange 510 ensuring proper operation of thief hatch 500. In addition to lubricating the inner surface 518 of seal flange 510, applicator ring 557 may also capture external debris before the debris is permitted to contact the seal 559 which may jeopardize the ability of seal 559 to adequately seal the annular interface between piston 552 and seal flange 510.

Figure 16:
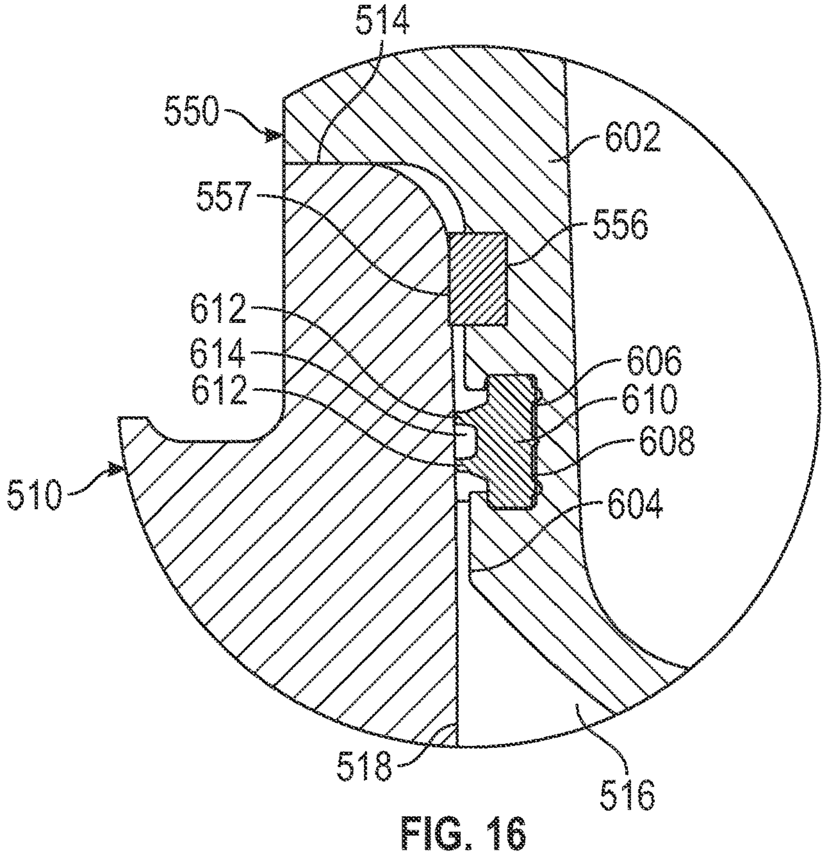
FIG. 16 is a zoomed-in, side cross-sectional view of another embodiment of a piston of the thief hatch of FIG. 10.

Referring to FIG. 16, another embodiment of piston 602 is shown comprising an outer surface 604 along which applicator groove 556 and an annular seal groove 606 are formed. An annular multi-lobed seal 608 is received in the seal groove 606 of piston 602 for sealing the interface formed between the outer surface 604 of piston 602 and the inner surface 518 of seal flange 510 when the piston 602 is in a closed position.

In this exemplary embodiment, multi-lobed seal 608 comprises a base 610 positioned within the seal groove 606 and a plurality of lobes 612 extending radially outwards from the base 610. Particularly, lobes 612 project outwardly from the seal groove 606 and slidably contact the inner surface 518 of seal flange 510. The base 610 of multi-lobed seal 608 has a greater width (extending in a direction parallel to a central axis of piston 602) than thickness (extending in a direction orthogonal to the central axis of piston 602), thereby securing the base 610 within the seal groove 606 and preventing the multi-lobed seal 608 from being inadvertently ejected from seal groove 606 during stroking of the piston 602.

Lobes 612 are permitted to flex relative to the base 610 in response to contact between lobes 612 and the inner surface 518 of seal flange 510, thereby minimizing friction between the lobes 612 and inner surface 518 which may be inconsistent in shape due to the presence of surface scratches, nicks, debris and other irregularities positioned along inner surface 518. Additionally, the flexible or pliable lobes 612 are configured to effectively wipe away debris located along the inner surface 518 of seal flange 510 such that wiped debris particles may be received and maintained in an annular pocket 614 formed axially between the pair of lobes 612, thereby enhancing the debris handling performance of the multi-lobed seal 608.

While embodiments of the disclosure have been shown and described, modifications thereof can be made by one skilled in the art without departing from the scope or teachings herein. The embodiments described herein are exemplary only and are not limiting. Many variations and modifications of the systems, apparatus, and processes described herein are possible and are within the scope of the disclosure. For example, the relative dimensions of various parts, the materials from which the various parts are made, and other parameters can be varied. Accordingly, the scope of protection is not limited to the embodiments described herein, but is only limited by the claims that follow, the scope of which shall include all equivalents of the subject matter of the claims. Unless expressly stated otherwise, the steps in a method claim may be performed in any order. The recitation of identifiers such as (a), (b), (c) or (1), (2), (3) before steps in a method claim are not intended to and do not specify a particular order to the steps, but rather are used to simplify subsequent reference to such steps.

What is claimed is:

1. A thief hatch for a pressure vessel system, the thief hatch comprising:

an annular seal flange extending between a first end and a second end opposite the first end, the seal flange comprising a central passage defined by an inner surface extending between the first end and the second end, wherein the first end is attachable to an opening of a pressure vessel of the pressure vessel system;

a piston coupled to the seal flange and receivable in the central passage, the piston comprising an outer surface defining an annular interface between the outer surface of the piston and the inner surface of the seal flange;

an annular seal assembly located along an annular interface between the outer surface of the piston and the inner surface of the seal flange, the seal assembly comprising an annular seal groove formed in one of the outer surface of the piston and the inner surface of the seal flange, and an annular seal at least partially received in the seal groove;

a biasing element coupled to the piston and configured to apply a biasing force against the piston to bias the piston towards a first position corresponding to a closed configuration of the thief hatch; and an annular wiper assembly located along the outer surface of the piston, the wiper assembly comprising an annular wiper groove formed in the outer surface of the piston and an annular wiper at least partially received in the wiper groove and in sliding contact with the inner surface of the seal flange to wipe the inner surface in response to actuation of the thief hatch between the closed configuration and an open configuration;

wherein the thief hatch comprises the closed configuration in which the piston occupies the first position with the seal of the seal assembly sealingly contacting both the outer surface of the piston and the inner surface of the seal flange to seal the interface between the outer surface of the piston and the inner surface of the seal flange, and the open configuration in which the piston occupies a second position in which the seal of the seal assembly is spaced from at least one of the outer surface of the piston and the inner surface of the seal flange to permit fluid communication through the interface.

2. The thief hatch of claim 1, wherein the inner surface of the seal flange comprises a tapered section having a taper angle, and wherein the annular seal contacts the tapered section of the inner surface when the thief hatch is in the closed configuration.

3. The thief hatch of claim 2, wherein the taper angle of the tapered section is between 2° and 8°.

4. The thief hatch of claim 2, wherein the inner surface comprises a frustoconical section located between the second end of the seal flange and the tapered section, and wherein the frustoconical section defines an annular relief extending radially between the frustoconical section and the outer surface of the piston.

5. The thief hatch of claim 1, wherein a flow area defined by the inner surface of the seal flange is greater at the second end of the seal flange than at the first end of the seal flange.

6. A pressure vessel system, comprising:

a pressure vessel defining an internal cavity and having an opening in fluid communication with the internal cavity; and the thief hatch of claim 1, wherein the first end of the seal flange of the thief hatch is attached to the opening of the pressure vessel whereby a fluid flowpath is established when the thief hatch is in the open configuration extending from the internal cavity of the pressure vessel, through the opening of the pressure vessel and through the central passage of the seal flange, and into the external environment surrounding the thief hatch;

wherein the thief hatch further comprises a weather cap coupled to the piston and comprising an external surface, and an internal surface opposite the external surface and defining an internal chamber in which the piston is at least partially received;

wherein the seal flange seals against the piston, a tank flange to which the thief hatch is configured to couple, and the weather cap when the thief hatch is in the closed configuration.

7. A thief hatch for a pressure vessel system, the thief hatch comprising an annular seal flange extending between a first end and a second end opposite the first end, the seal flange comprising a central passage defined by an inner surface extending between the first end and the second end, wherein the first end is attachable to an opening of a pressure vessel of the pressure vessel system, a piston coupled to the seal flange and receivable in the central passage the piston comprising an outer surface defining an annular interface between the outer surface of the piston and the inner surface of the seal flange;

an annular seal assembly located along an annular interface between the outer surface of the piston and the inner surface of the seal flange, the seal assembly comprising an annular seal groove formed in one of the outer surface of the piston and the inner surface of the seal flange, and an annular seal at least partially received in the seal groove;

a biasing element coupled to the piston and configured to apply a biasing force against the piston to bias the piston towards a first position corresponding to a closed configuration of the thief hatch;

a centering rod extending having a central axis that extends coaxially with a central axis of the piston, wherein the centering rod couples the piston to the seal flange so as to minimize angular deviations between the central axis of the piston and a central axis of the seal flange; and one or more support rods and a crossbar, wherein the one or more support rods couple between the crossbar and the seal flange and the crossbar defines a central aperture through which the centering rod extends, and wherein a friction reduction sleeve is positioned radially between the crossbar and the centering rod to reduce frictional drag between the crossbar and the centering rod;

wherein the crossbar comprises one or more apertures for receiving the one or more support rods, wherein a radial tolerance of at least 0.025 inches or greater is provided between the one or more apertures and the one or more corresponding support rods received therein;

wherein the thief hatch comprises the closed configuration in which the piston occupies the first positon with the seal of the seal assembly sealingly contacting both the outer surface of the piston and the inner surface of the seal flange to seal the interface between the outer surface of the piston and the inner surface of the seal flange and an open configuration in which the piston occupies a second position in which the seal of the seal assembly is spaced from at least one of the outer surface of the piston and the inner surface of the seal flange to permit fluid communication through the interface.

8. The thief hatch of claim 7, wherein the annular seal of the seal assembly comprises a multi-lobed seal comprising a base and a plurality of lobes extending from the base.

9. The thief hatch of claim 7, further comprising a monolithic piston guide affixed to the seal flange and slidably coupled to the piston whereby the monolithic piston guide is configured to guide the piston between the first position and the second position.

10. The thief hatch of claim 7, wherein the seal flange comprises a vertically projecting stop pin configured to contact the outer surface of the piston when the piston is in the first position.

11. A thief hatch for a pressure vessel system, the thief hatch comprising:

an annular seal flange extending between a first end and a second end opposite the first end, the seal flange comprising a central passage defined by an inner surface extending between the first end and the second end, wherein the first end is attachable to an opening of a pressure vessel of the pressure vessel system;

a piston coupled to the seal flange and receivable in the central passage, the piston comprising an outer surface defining an annular interface between the outer surface of the piston and the inner surface of the seal flange;

an annular seal assembly located along an annular interface between the outer surface of the piston and the inner surface of the seal flange, the seal assembly comprising an annular seal groove formed in one of the outer surface of the piston and the inner surface of the seal flange, and an annular seal at least partially received in the seal groove;

a biasing element coupled to the piston and configured to apply a biasing force against the piston to bias the piston towards a first position corresponding to a closed configuration of the thief hatch; and an annular applicator ring positioned along the outer surface of the piston, the annular applicator comprising an absorbent material impregnated with a lubricant for lubricating the inner surface of the seal flange;

wherein the thief hatch comprises the closed configuration in which the piston occupies the first position with the seal of the seal assembly sealingly contacting both the outer surface of the piston and the inner surface of the seal flange to seal the interface between the outer surface of the piston and the inner surface of the seal flange, and an open configuration in which the piston occupies a second position in which the seal of the seal assembly is spaced from at least one of the outer surface of the piston and the inner surface of the seal flange to permit fluid communication through the interface.

12. A thief hatch for a pressure vessel system, the thief hatch comprising:

an annular seal flange extending between a first end and a second end opposite the first end the seal flange comprising a central passage defined by an inner surface extending between the first end and the second end, wherein the first end is attachable to an opening of a pressure vessel of the pressure vessel system;

a piston coupled to the seal flange and receivable in the central passage, the piston comprising an outer surface defining an annular interface between the outer surface of the piston and the inner surface of the seal flange;

an annular seal assembly located along an annular interface between the outer surface of the piston and the inner surface of the seal flange, the seal assembly comprising an annular seal groove formed in one of the outer surface of the piston and the inner surface of the seal flange and an annular seal at least partially received in the seal groove;

a biasing element coupled to the piston and configured to apply a biasing force against the piston to bias the piston towards a first position corresponding to a closed configuration of the thief hatch; and a grounding member received in an aperture of the seal flange, the grounding member comprising a pointed end for piercing an exterior surface of a tank flange to which the thief hatch is configured to couple;

wherein the thief hatch comprises the closed configuration in which the piston occupies the first position with the seal of the seal assembly sealingly contacting both the outer surface of the piston and the inner surface of the seal flange to seal the interface between the outer surface of the piston and the inner surface of the seal flange, and an open configuration in which the piston occupies a second position in which the seal of the seal assembly is spaced from at least one of the outer surface of the piston and the inner surface of the seal flange to permit fluid communication through the interface.

13. A thief hatch for a pressure vessel system, the thief hatch comprising:

an annular seal flange extending between a first end and a second end opposite the first end the seal flange comprising a central passage, wherein the first end is attachable to an opening of a pressure vessel of the pressure vessel system;

a piston coupled to the seal flange and receivable in the central passage, the piston comprising an outer surface defining an annular interface between the outer surface of the piston and a surface of the seal flange;

an annular seal assembly located along an annular interface between the outer surface of the piston and an inner surface of the seal flange, the seal assembly comprising an annular seal groove formed in one of the outer surface of the piston and the inner surface of the seal flange, and an annular seal at least partially received in the seal groove; and a biasing element coupled to the piston and configured to apply a biasing force against the piston to bias the piston towards a first position corresponding to a closed configuration of the thief hatch;

wherein the thief hatch comprises the closed configuration in which the piston occupies the first position with an X-ring seal of the seal assembly sealingly contacting both the outer surface of the piston and the surface of the seal flange to seal the interface between the outer surface of the piston and the surface of the seal flange, and an open configuration in which the piston occupies a second position in which the X-ring seal of the seal assembly is spaced from at least one of the outer surface of the piston and the surface of the seal flange to permit fluid communication through the annular interface, wherein the X-ring seal has a radial unsqueezed width and a radial squeezed width that is less than the radial unsqueezed width, and wherein a ratio of the radial squeezed width to the radial unsqueezed width is between 0.900:1 and 0.995:1.

14. The thief hatch of claim 13, wherein the surface of the seal flange comprises an inner surface that defines the central passage of the seal flange against which the annular seal of the seal assembly is in sealing contact when the thief hatch is in the closed configuration.

15. The thief hatch of claim 13, wherein the piston is configured to actuate the thief hatch from the closed configuration to the open configuration in response to the application of a fluid pressure directed against the biasing force of the biasing element, wherein the fluid pressure is less than five pounds per square inch (PSI).

16. The thief hatch of claim 13, wherein the annular seal of the seal assembly comprises a multi-lobed seal comprising a base and a plurality of lobes extending from the base.

17. A pressure vessel system, comprising:

a pressure vessel defining an internal cavity and having an opening in fluid communication with the internal cavity; and the thief hatch of claim 13, wherein the first and of the seal flange of the thief hatch is attached to the opening of the pressure vessel whereby a fluid flowpath is established when the thief hatch is in the open configuration extending from the internal cavity of the pressure vessel, through the opening of the pressure vessel and through the central passage of the seal flange, and into the external environment surrounding the thief hatch.

18. A thief hatch for a pressure vessel system, the thief hatch comprising:

an annular seal flange extending between a first end and a second end opposite the first end, the seal flange comprising a central passage, wherein the first end is attachable to an opening of a pressure vessel of the pressure vessel system;

a piston coupled to the seal flange and receivable in the central passage, the piston comprising an outer surface defining an annular interface between the outer surface of the piston and a surface of the seal flange;

an annular seal assembly located along an annular interface between the outer surface of the piston and an inner surface of the seal flange, the seal assembly comprising an annular seal groove formed in one of the outer surface of the piston and the inner surface of the seal flange, and an annular seal at least partially received in the seal groove; and a biasing element coupled to the piston and configured to apply a biasing force against the piston to bias the piston towards a first position corresponding to a closed configuration of the thief hatch;

wherein the thief hatch comprises the closed configuration in which the piston occupies the first position with an X-ring seal of the seal assembly sealingly contacting both the outer surface of the piston and the surface of the seal flange to seal the interface between the outer surface of the piston and the surface of the seal flange, and an open configuration in which the piston occupies a second Position in which the X-ring seal of the seal assembly is spaced from at least one of the outer surface of the piston and the surface of the seal flange to permit fluid communication through the annular interface;

wherein the seal groove extends radially between a radially inner base and a radially outer opening, and wherein the width of the base of the seal groove is greater than the width of the opening of the seal groove whereby the opening of the groove axially compresses the X-ring seal; and wherein a ratio of the width of the base of the seal groove to the width of the opening of the seal groove is between 1.2:1 to 1.5:1.

19. The thief hatch of claim 18, further comprising a monolithic piston guide affixed to the seal flange and slidably coupled to the piston whereby the monolithic piston guide is configured to guide the piston between the first position and the second position.

20. The thief hatch of claim 18, wherein the seal flange comprises a vertically projecting stop pin configured to contact the outer surface of the piston when the piston is in the first position.

21. A thief hatch for a pressure vessel system, the thief hatch comprising:

an annular seal flange extending between a first end and a second end opposite the first end, the seal flange comprising a central passage, wherein the first end is attachable to an opening of a pressure vessel of the pressure vessel system;

a piston coupled to the seal flange and receivable in the central passage, the piston comprising an outer surface defining an annular interface between the outer surface of the piston and a surface of the seal flange;

an annular seal assembly located along an annular interface between the outer surface of the piston and an inner surface of the seal flange, the seal assembly comprising an annular seal groove formed in one of the outer surface of the piston and the inner surface of the seal flange, and an annular seal at least partially received in the seal groove;

a biasing element coupled to the piston and configured to apply a biasing force against the piston to bias the piston towards a first position corresponding to a closed configuration of the thief hatch; and a grounding member received in an aperture of the seal flange, the grounding member comprising a pointed end for piercing an exterior surface of a tank flange to which the thief hatch is configured to couple;

wherein the thief hatch comprises the closed configuration in which the piston occupies the first position with an X-ring seal of the seal assembly sealingly contacting both the outer surface of the piston and the surface of the seal flange to seal the interface between the outer surface of the piston and the surface of the seal flange, and an open configuration in which the piston occupies a second position in which the X-ring seal of the seal assembly is spaced from at least one of the outer surface of the piston and the surface of the seal flange to permit fluid communication through the annular interface.

22. A thief hatch for a pressure vessel system, the thief hatch comprising, an annular seal flange extending between a first end and a second end opposite the first end, the seal flange comprising a central passage, wherein the first end is attachable to an opening of a pressure vessel of the pressure vessel system, a piston coupled to the seal flange and receivable in the central passage, the piston comprising an outer surface defining an annular interface between the outer surface of the piston and a surface of the seal flange;

an annular seal assembly located along an annular interface between the outer surface of the piston and the surface of the seal flange, the seal assembly comprising an annular seal groove formed in one of the outer surface of the piston and the surface of the seal flange, and an annular seal at least partially received in the seal groove;

a biasing element coupled to the piston and configured to apply a biasing force against the piston to bias the piston towards a first position corresponding to a closed configuration of the thief hatch;

a weather cap coupled to the piston and comprising an external surface, and an internal surface opposite the external surface and defining an internal chamber in which the piston is at least partially received; and an annular breathable gasket contacting both the internal surface of the weather cap and the second end of the seal flange to prevent debris from entering the internal chamber of the weather cap when the thief hatch is in the closed configuration;

wherein the thief hatch comprises the closed configuration in which the piston occupies the first position with the seal of the seal assembly sealingly contacting both the outer surface of the piston and the surface of the seal flange to seal the interface between the outer surface of the piston and the surface of the seal flange, and an open configuration in which the piston occupies a second position in which the seal of the seal assembly is spaced from at least one of the outer surface of the piston and the surface of the seal flange to permit fluid communication through the annular interface;

wherein the breathable gasket prevents at least some solid particles from entering the internal chamber from the external environment when the thief hatch is in the closed configuration but permits the communication of gasses between the internal chamber and the external environment when the thief hatch is in the closed configuration.

23. The thief hatch of claim 22, wherein:

the surface of the seal flange comprises an inner surface that defines the central passage of the seal flange against which the annular seal of the seal assembly is in sealing contact when the thief hatch is in the closed configuration; and an axially-projected surface area of the internal surface of the weather cap is greater than an axially-projected surface are of the outer surface of the piston.

24. The thief hatch of claim 22, wherein the annular seal of the seal assembly comprises a multi-lobed seal comprising a base and a plurality of lobes extending from the base.

25. The thief hatch of claim 22, further comprising a monolithic piston guide affixed to the seal flange and slidably coupled to the piston whereby the monolithic piston guide is configured to guide the piston between the first position and the second position.

26. The thief hatch of claim 22, wherein the seal flange comprises a vertically projecting stop pin configured to contact the outer surface of the piston when the piston is in the first position.

27. A thief hatch for a pressure vessel system, the thief hatch comprising:

an annular seal flange extending between a first end and a second end opposite the first end, the seal flange comprising a central passage, wherein the first end is attachable to an opening of a pressure vessel of the pressure vessel system;

a piston coupled to the seal flange and receivable in the central passage, the piston comprising an outer surface defining an annular interface between the outer surface of the piston and a surface of the seal flange;

an annular seal assembly located along an annular interface between the outer surface of the piston and the surface of the seal flange, the seal assembly comprising an annular seal roove formed in one of the outer surface of the piston and the surface of the seal flange, and an annular seal at least partially received in the seal groove;

a biasing element coupled to the piston and configured to apply a biasing force against the piston to bias the piston towards a first position corresponding to a closed configuration of the thief hatch;

a weather cap coupled to the piston and comprising an external surface, and an internal surface opposite the external surface and defining an internal chamber in which the piston is at least partially received;

an annular breathable gasket contacting both the internal surface of the weather cap and the second end of the seal flange to prevent debris from entering the internal chamber of the weather cap when the thief hatch is in the closed configurator; and an annular applicator ring positioned along the outer surface of the piston, the annular applicator comprising an absorbent material impregnated with a lubricant for lubricating an inner surface of the seal flange;

wherein the thief hatch comprises the closed configuration in which the piston occupies the first position with the seal of the seal assembly sealingly contacting both the outer surface of the piston and the surface of the seal flange to seal the interface between the outer surface of the piston and the surface of the seal flange, and an open configuration in which the piston occupies a second position in which the seal of the seal assembly is spaced from at least one of the outer surface of the piston and the surface of the seal flange to permit fluid communication through the annular interface.

* * * * *